(12) United States Patent
Shaikh et al.

(10) Patent No.: US 11,964,252 B2
(45) Date of Patent: Apr. 23, 2024

(54) SORBENT AND DEVICES FOR CAPTURING, STABILIZING, AND RECOVERING VOLATILE AND SEMI-VOLATILE COMPOUNDS

(71) Applicant: XPLOSAFE, LLC, Stillwater, OK (US)

(72) Inventors: Shoaib F. Shaikh, Stillwater, OK (US); Allen W. Apblett, Stillwater, OK (US); Nicholas F. Materer, Stillwater, OK (US); Evgueni Kadossov, Stillwater, OK (US); Michael L. Teicheira, Stillwater, OK (US)

(73) Assignee: XPLOSAFE, LLC, Stillwater, OK (US)

( * ) Notice: Subject to any disclaimer, the term of this patent is extended or adjusted under 35 U.S.C. 154(b) by 747 days.

(21) Appl. No.: 17/157,526

(22) Filed: Jan. 25, 2021

(65) Prior Publication Data

US 2021/0260562 A1   Aug. 26, 2021

Related U.S. Application Data

(63) Continuation-in-part of application No. 17/116,492, filed on Dec. 9, 2020, now Pat. No. 11,534,735, and
(Continued)

(51) Int. Cl.
*C06B 45/00* (2006.01)
*B01D 53/02* (2006.01)
(Continued)

(52) U.S. Cl.
CPC ............ *B01J 20/103* (2013.01); *B01D 53/02* (2013.01); *B01J 20/28021* (2013.01);
(Continued)

(58) Field of Classification Search
CPC ................ B01J 20/103; B01J 20/28064; B01J 20/28073; B01J 20/28083; B01J 20/3204;
(Continued)

(56) References Cited

U.S. PATENT DOCUMENTS 7,295,308 B1 * 11/2007 Samuels ............ G01N 15/0643
356/326
7,932,089 B2    4/2011 Cohen-Arazi
(Continued)

OTHER PUBLICATIONS

Ewlad-Ahmed et al. ("Removar of Formaldehyde from air using functionalized silica supports" in Environ. Sci. Tech. (2012), 46(24), 13354-13360).
(Continued)

*Primary Examiner* — James E McDonough
(74) *Attorney, Agent, or Firm* — INNOVAR, L.L.C.; Rick Matos

(57) ABSTRACT

The present invention provides an improved sorbent and corresponding device(s) and uses thereof for the capture and stabilization of volatile organic compounds (VOC) or semi-volatile organic compounds (SVOC) from a gaseous atmosphere. The sorbent is capable of rapid and high uptake of one or more compounds and provides quantitative release (recovery) of the compound(s) when exposed to elevated temperature and/or organic solvent. Uses of particular improved grades of mesoporous silica are disclosed.

17 Claims, 18 Drawing Sheets

Related U.S. Application Data a continuation-in-part of application No. PCT/US2019/043140, filed on Jul. 24, 2019, said application No. 17/116,492 is a continuation of application No. PCT/US2019/043140, filed on Jul. 24, 2019, and a continuation of application No. 16/224,049, filed on Dec. 18, 2018, now Pat. No. 11,458,451, which is a continuation-in-part of application No. 16/045,435, filed on Jul. 25, 2018, now Pat. No. 10,866,166, and a continuation-in-part of application No. 15/137,055, filed on Apr. 25, 2016, now Pat. No. 10,365,075.

(60) Provisional application No. 62/152,439, filed on Apr. 24, 2015.

(51) Int. Cl.
| | |
|---|---|
| *B01J 20/10* | (2006.01) |
| *B01J 20/28* | (2006.01) |
| *B01J 20/32* | (2006.01) |
| *C01B 33/18* | (2006.01) |
| *C06B 21/00* | (2006.01) |
| *C06B 23/00* | (2006.01) |
| *F42D 5/04* | (2006.01) |

(52) U.S. Cl.
CPC ... *B01J 20/28064* (2013.01); *B01J 20/28073* (2013.01); *B01J 20/28076* (2013.01); *B01J 20/28083* (2013.01); *B01J 20/3204* (2013.01); *B01J 20/3219* (2013.01); *B01J 20/3246* (2013.01); *B01J 20/3293* (2013.01); *C01B 33/18* (2013.01); *C06B 21/0091* (2013.01); *C06B 23/00* (2013.01); *C06B 45/00* (2013.01); *F42D 5/04* (2013.01); *B01D 2253/106* (2013.01); *B01D 2257/708* (2013.01); *B01D 2259/4583* (2013.01); *C01P 2002/82* (2013.01); *C01P 2004/04* (2013.01); *C01P 2004/13* (2013.01); *C01P 2006/12* (2013.01); *C01P 2006/14* (2013.01); *C01P 2006/16* (2013.01)

(58) Field of Classification Search
CPC .. B01J 20/3246; C06B 21/0091; C06B 45/00; F42D 5/04
USPC .......................................................... 86/50
See application file for complete search history.

(56) References Cited

U.S. PATENT DOCUMENTS

| | | | |
|---|---|---|---|
| 7,955,574 B2 | 6/2011 | Fryxell et al. | |
| 8,011,224 B2 | 9/2011 | Kendler et al. | |
| 8,067,110 B2 | 11/2011 | Rakow | |
| 8,114,230 B1 | 2/2012 | Basom | |
| 8,500,852 B2 | 8/2013 | Galbraith | |
| 8,561,484 B2 * | 10/2013 | Tipler ................... | G01N 1/405 422/430 |
| 8,563,316 B2 | 10/2013 | Duffy | |
| 8,668,873 B2 | 3/2014 | Almirall et al. | |
| 8,955,515 B2 | 2/2015 | Rakow et al. | |
| 9,079,049 B2 | 7/2015 | Tobias et al. | |
| 9,249,241 B2 | 2/2016 | Dai et al. | |
| 9,329,278 B2 | 5/2016 | Yoder | |
| 9,370,749 B2 | 6/2016 | Addleman et al. | |
| 9,412,573 B2 | 8/2016 | Almirall et al. | |
| 9,643,186 B1 | 5/2017 | Ahmad et al. | |
| 9,783,417 B2 | 10/2017 | Chandran et al. | |
| 9,901,843 B2 | 2/2018 | Todosiev et al. | |
| 9,914,087 B2 * | 3/2018 | Marotta ............... | B01J 20/3416 |
| 2007/0221087 A1 | 9/2007 | Adebimpe | |
| 2008/0276804 A1 | 11/2008 | Sayari | |
| 2009/0199936 A1 | 8/2009 | Hagit | |
| 2012/0071362 A1 * | 3/2012 | Nhan ..................... | G01N 17/04 422/98 |
| 2014/0017805 A1 | 1/2014 | Addleman | |
| 2014/0322518 A1 | 10/2014 | Addleman | |

OTHER PUBLICATIONS

Hung et al. ("Ordered mesoporous silica particles and Si-MCM-41 for the adsorption of acetone: a comparative study" in Sep. Purif. Technol. (2009) 64(3), Elsevier Science, Amsterdam, NL).

Kwong et al. ("Removal of VOCs from indoor environment by ozonation over different porous materials" in Atmos. Environ. (2007), 42(10), 2300-2311, Elsevier, Amsterdam, NL).

Idris et al. ("A Comparative study of selected sorbents for sampling of aromatic VOCS from indoor air" in Anal. Methods (2010), 2(11), 1803-1809).

Idris et al. ("Large pore diameter MCM-41 and its application for lead removal from aqueous media" in J. Hazard Mater. (2011), 185(2-3), 898-904).

R.C. Phillips ("Training dogs for explosives detection" in U.S. Army and Land Warfare Laboratory, Technical Memorandum LWL-CR-01B70 (1971), 1-52).

Apblett et al. ("Synthesis of mesoporous silica grafted with 3-glycidylpropyltrimethoxy-silane" in Mater. Let. (2009), 63(27), 2331-2334).

Apblett et al. ("Preparation of mesoporous silica with grafted chelating agents for uptake of metal ions" in Chemical Engineering Journal (2009), 155(3), 916-924).

Apblett et al. ("Metal ion adsorption using polyamine-functionalized mesoporous materials prepared from bromopropyl-functionalized mesoporous silica" in Journal of Hazardous Materials (2010), 182, 581-590).

Apblett et al. ("3-Aminopropyltrimethoxysilane functionalized mesoporous materials and uptake of metal Ions" in Asian J. Chem. (2011), 23(2), 541-546).

Tuel et al. ("Synthesis and Characterization of trivalent metal containing mesoporous silicas obtained by a neutral templating route" in Chem. Mater. (1996), 8, 114).

Sigma Aldrich Catalog ("MCM-41, pellet", Item No. 900773; https://www.sigmaaldrich.com/united-states.html; (2018)).

Apblett et al. ("Explosive-containing Porous Materials as Non-detonable Training Aid", U.S. Appl. No. 15/137,055, filed Apr. 25, 2016; unpublished).

Zhu et al. ("High-performance humidity sensors based on quartz crystal micro-balance coated with mesoporous silica MCM-41 thin film" in Materials Technology (2017), 32, 101-104).

Alothman et al. ("Synthesis and characterization of a hexagonal mesoporous silica with enhanced thermal and hydrothermal stabilities", in Applied Surface Science (2010), 256, 3573-3580).

* cited by examiner

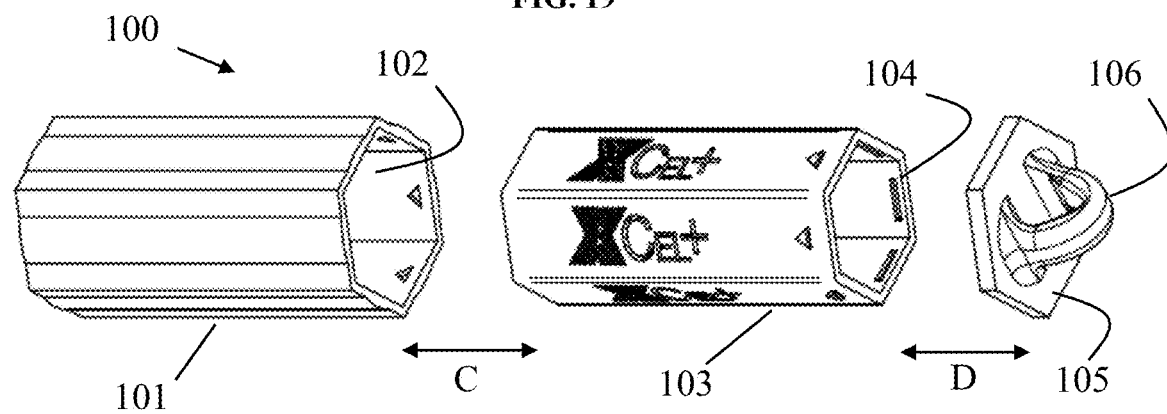

SORBENT AND DEVICES FOR CAPTURING, STABILIZING, AND RECOVERING VOLATILE AND SEMI-VOLATILE COMPOUNDS

CROSS-REFERENCE TO EARLIER FILED APPLICATIONS

The present application claims the benefit of and is a continuation in part of application Ser. No. 17/116,492 filed Dec. 9, 2020, which is a continuation of Ser. No. 16/224,049 filed Dec. 18, 2018, which is a continuation-in-part of application Ser. No. 16/045,435 filed Jul. 25, 2018, now U.S. Ser. No. 10/866,166 issued Dec. 15, 2020, and said application Ser. No. 16/224,049 is a continuation-in-part of application Ser. No. 15/137,055 filed Apr. 25, 2016, now U.S. Ser. No. 10/365,075 issued Jul. 30, 2019, which claims the benefit of provisional application No. 62/152,439 filed Apr. 24, 2015, and said application Ser. No. 17/116,492 is a continuation of PCT/US2019/043140 filed Jul. 24, 2019, which claims the benefit of said application Ser. No. 16/045,435, and the present application is a continuation-in-part of said PCT/US2019/043140, the entire disclosures of which are hereby incorporated by reference.

STATEMENT REGARDING FEDERALLY SPONSORED RESEARCH

This invention was made with government support under contract Nos. D10PC20044, D12PC00335, FA8650-6-M-6685, 1R43E5027736-01, 70NANB16H187, W81WH-17-C-0088 awarded by the Small Business Innovation Research program. The government has certain rights in the invention.

FIELD OF THE INVENTION

The present invention concerns systems, apparatuses, and methods used to capture, stabilize, and recover volatile and semi-volatile compounds. More particularly, the invention concerns sorbent materials useful in sampling chemical vapors for area monitoring and personal exposure monitoring through the application of diffusive samplers (passive dosimeters). The invention also includes a means of pre-concentrating chemical vapors present in very small amounts to facilitate atmospheric sampling. The invention also provides systems, apparatuses, compositions, and methods used for training animals to detect volatile organic compounds or semi-volatile organic compounds. The invention also provides a non-detonable explosive-containing sorbent.

BACKGROUND OF THE INVENTION

Industrial, medical, office, and military personnel, as well as people who live or work in residential buildings, can be exposed to a broad range of potentially toxic compounds. This potential for exposure makes environmental monitoring important. However, in some cases monitoring proves difficult, because the person may be highly mobile throughout the day or week; and move from one potential exposure area to the next. In other cases, the person may be working or living in a rugged and sometimes remote location that requires sending collected samples to a distant lab for analysis. Also, there is always a possibility that a person may be exposed to an unknown or unidentified toxic compound whose effect may not be known or experienced until long after the exposure ends.

The art discloses devices for capture of volatile compounds: U.S. Pat. Nos. 9,370,749, 7,955,574, 9,412,573, 9,914,087, 9,901,843, 9,783,417, 9,643,186, 9,249,241, 9,079,049, 8,955,515, 8,668,873, 8,561,484, 8,500,852, 8,011,224 and 7,295,308. U.S. Pat. No. 9,370,749 to Addleman et al. discloses a porous multi-component material for capture and separation of species of interest. The material includes a substrate and a composite thin film, which comprises a combination of porous polymer and nanostructured material. The requirement of the porous polymer along with the nanostructured material is disadvantageous, because there is a significant potential of thermal degradation of the porous polymer during thermal desorption analysis of the composite thin film and a significant potential of contamination, by monomeric and dimeric species, of an extract during solvent extraction of the composite thin film.

Apblett et al. ("Synthesis of mesoporous silica grafted with 3-glycidylpropyltrimethoxy-silane" in *Mater. Let.* (2009), 63(27), 2331-2334; "Preparation of mesoporous silica with grafted chelating agents for uptake of metal ions" in *Chemical Engineering Journal* (2009), 155(3), 916-924; "Metal ion adsorption using polyamine-functionalized mesoporous materials prepared from bromopropyl-functionalized mesoporous silica" in *Journal of Hazardous Materials* (2010), 182, 581-590; "3-Aminopropyltrimethoxysilane functionalized mesoporous materials and uptake of metal Ions" in *Asian J. Chem.* (2011), 23(2), 541-546) disclose the synthesis of mesoporous silica covalently grafted with various different silane groups, e.g. 3-glycidylpropyl-silane, 3-aminopropyl-silane, by treatment of mesoporous silica (OSU-6-W) with a trialkoxysilane or trihalosilane. The material was used for adsorption of divalent transition metal from aqueous solution. The OSU-6-W was prepared according to a modified method of Tuel et al. ("Synthesis and Characterization of trivalent metal containing mesoporous silicas obtained by a neutral templating route" in *Chem. Mater.* (1996), 8, 114) or according to a modified method of Apblett et al. ("Preparation of mesoporous silica with grafted chelating agents for uptake of metal ions" in *Chemical Engineering Journal* (2009), 155(3), 916-924).

Mesoporous silica of the MCM-41 type (hexagonal; CAS 7631-86-9; linear formula $SiO_2$; MW 60.08) is available from Sigma Aldrich (Milwaukee, Wis.) and is known to possess the following physical properties.

| Linear formula | $SiO_2$ |
| --- | --- |
| Form | White powder |
| Pore size (diameter) | 2-10 nm |
| Pore volume | 0.5-2.0 $cm^3/g$ |
| Surface area | ~1000 $m^2/g$ (BET) |

Prior art monitoring devices, such as area sensors and personal dosimeters, also make use of passive sampling media such as activated charcoal and complex polymers. While this media can capture a variety of volatile and semi-volatile compounds, its capacity, rate of uptake, and storage stability are limited. For example, storage stability is typically limited to about 14 to 28 days post-exposure. This length of time can be too short where collected samples must be sent to a distant lab or where the sample must be stored for longer periods of time for future analysis or identification.

Animals, such as canines, trained to detect explosives provide a first line of defense at airports, postal facilities and military installations, and help protect police, fire, military and civilian personnel from explosive threats. Typically, canines (explosives detector dogs, aka EDD) are trained to detect standard explosives (seven traditional types including 2,4,6-trinitrotoluene (TNT), and hexahydro-1,3,5-trinitro-1,3,5 triazine (RDX) in addition to improvised primary explosives (e.g., peroxide based, chlorate). Currently, best practices dictate that the canines are trained using actual explosives, and that this training occurs on a continuous basis. Exemplary training methods are disclosed the U.S. Army Land Warfare Laboratory at the Aberdeen Proving Ground, Md., US ("Training dogs for explosives detection" in Technical Memorandum No. LWL-CR-01B70, Interim Report, October 1971, pg 1-52) for work performed under contract No. DAAD05-70-C-0347, the entire disclosure of which is hereby incorporated by reference.

Because the utilization of actual explosives requires trained personnel who are qualified in handling explosive materials, the canine training is both manpower-intensive and costly. The expense is further exacerbated by the need to handle and dispose of the explosive material according to local, state, and federal explosives regulations. Furthermore, the training aids, whether real or a surrogate, are expensive and not readily available for many potential explosive threats such as hexamethylene triperoxide diamine (HMTD). Additionally, the use of real explosives creates an inherent risk of injury to the canine and its handler.

Working with the explosives in the pure form is extremely risky. The risk of injury is especially problematic for peroxide-based improvised explosives such as HMTD and triacetone triperoxide (TATP) that are extremely sensitive to mechanical and environmental shocks. HMTD can even react with many common metals in a process that can lead to detonation.

It would be a significant advance in the field of monitoring of volatile organic compounds and semi-volatile organic compounds to provide a device with the ability to capture extremely low to high amounts of a wide array of structurally diverse target compound(s) while at the same time being capable of long-term storage without excessive desorption or degradation of the captured compound(s). It would also be a significant advance in the field to provide devices comprising sorbent excluding organic polymers, which can interfere with thermal desorption-based and extraction-based methods for quantitation of the captured compounds. It would also be a significant advance in the field of animal training or calibrating and testing explosive/chemical sensors to provide a system, apparatus or composition that generates vapors of chemically explosive compounds in a non-detonable form. It would also be an advance in the field to provide a sampling device that can simultaneously collect samples with varying levels or periods of exposure to an environment of use.

SUMMARY OF THE INVENTION

An object of the invention is to provide an improved sorbent and corresponding devices that overcomes one or more disadvantages of known monitoring devices. The sorbent and device of the invention are capable of capturing and stabilizing low to high amounts of one or more volatile organic compound(s) (VOC) or semi-volatile organic compound(s) (SVOC) present in a gaseous environment, i.e. airborne VOC or SVOC. The sorbent also facilitates subsequent quantitative recovery of the captured compound(s). The device can be a dosimeter, a training device, a preconcentrator, a filter, or other know device for capturing and/or temporarily retaining VOC or SVOC. Some embodiments of the device can simultaneously collect samples with varying periods of exposure to an environment of use.

Another object of the invention is to provide a training device and method. Accordingly, the sorbent described herein can be incorporated into a training device and employed in respective training methods. In one aspect, the training device comprises a substrate (body), and sorbent medium onto which one or more VOC or SVOC has been adsorbed. The training device can be used to train animals that sense airborne VOC or SVOC compounds or as controls for other devices (instruments) that sense airborne VOC or SVOC compounds.

Other objectives of the invention include, but are not limited to, providing an animal training aid that: (1) employs extremely low amounts of explosive material, negating safety hazards inherent in the use of explosives; (2) utilizes surface adsorption within pores of the sorbent to permit use of a small amount of the explosive material to simulate the vapor produced from a much larger amount; (3) reduces the costs associated with training personnel for handling actual explosives, and (4) eliminates the need for the special storage, handling and disposal requirements associated with sufficient amounts of bulk explosives.

The dosimeter can be used to monitor the presence of such compounds in a gaseous environment, such as a work area. Embodiments of the dosimeter with adsorbed VOC or SVOC exhibit long-term storage stability for up to 18 weeks with regard to the adsorbed compound(s), meaning the adsorbed compound undergoes little to no degradation or desorption during storage at room temperature or in a refrigerator (+6° C. to +24° C.). Of an exceptional advance is the sorbent ability to stabilize reactive species within the nanopores at room temperature. Such species would chemically react with typical polymer-based dosimeters even under refrigeration.

The device of the invention can be adapted to almost any known format of passive sampling device. It can be a badge, rod, tube, pen, plate, or any other form that allows contact with the environment.

One aspect of the invention provides a device comprising a sorbent (a porous medium) that, at ambient conditions, passively captures (adsorbs, entraps) one or more VOC or SVOC present in a gaseous atmosphere, i.e. one or more airborne VOC or SVOC, and, when exposed to elevated temperatures or organic solvent, releases the captured one or more compounds. This means the VOC or SVOC can be removed from the sorbent by thermal desorption and/or solvent extraction. The porous medium is adhered onto a substrate and does not require inclusion of a porous polymer or other polymer within the porous medium to adhere the porous medium onto the substrate. The sorbent may be in powder form, pellet form, or applied on the surface of a substrate.

The sorbent can be applied onto the substrate uniformly or non-uniformly. The layer(s) of sorbent on the substrate can be divided into two or more sections. Each section may comprise the same amount of sorbent, or two or more of the sections may comprise different amounts of sorbent. The substrate can also be sectioned. (FIGS. 6A and 6B) The sections can be separated and stored for different purposes, e.g. immediate sampling, sample archiving (storage), etc.

Specific embodiments of the invention include those wherein: a) the porous medium is nanoporous; b) the porous medium comprises silica; c) the porous medium comprises nanoporous silica; d) the porous medium further comprises one or more adsorption modifiers; e) the dosimeter comprises a body (substrate) onto which the porous medium has been applied; f) the porous medium excludes a porous polymer; g) the porous medium is non-covalently bound to the substrate; h) the porous medium comprises mesoporous silica; g) the porous medium comprises mesoporous silica of the MCM-41 type having hexagonal cylindrical (tubular) pore structure; and/or h) the sorbent (porous medium) excludes an organic polymer. The mesoporous silica can also be dispersed in a support material such as glass wool to fabricate filters.

In some embodiments, the sorbent (porous medium) is a functionalized sorbent, meaning it has been functionalized with one or more adsorption modifier functional groups that improve (in at least one aspect) the adsorption of one or more VOC's or SVOC's. Embodiments of the invention include those wherein: a) the one or more adsorption modifier functional groups are covalently bound to the porous medium; b) the one or more adsorption modifier functional groups are non-covalently bound to the porous medium; c) the mass content of functional groups in the porous medium as determined by thermogravimetric analysis is in the range of 20-25% or up to 25%; or d) a combination of any two or more thereof.

The sorbent can comprise a single porous medium or a combination of porous mediums. Embodiments of the invention include those wherein: a) the sorbent comprises non-functionalized mesoporous silica; b) the sorbent comprises functionalized mesoporous silica; c) the sorbent comprises a mixture of non-functionalized mesoporous silica and one or more functionalized mesoporous silicas; or d) the sorbent comprises a mixture of non-functionalized mesoporous silica, a first functionalized mesoporous silica, and a second functionalized mesoporous silica. The weight ratio of non-functionalized mesoporous silica to functionalized mesoporous silica can range from about 1:100 to about 100:1 or as otherwise described herein.

Grafting of mesoporous silica with biphenyl- and methoxytriethylenoxypropyl-functional groups in many cases increases its affinity to/for non-polar and polar VOC, respectively. In various mixes of functionalized and non-functionalized sorbents, the contents of functionalized sorbent ranges between 0 to about 30 wt % with the remainder comprising the non-functionalized sorbent. In some embodiments, the composition comprises: a) about 50 wt % of non-functionalized sorbent, about 30 wt % of biphenyl-functionalized sorbent, and about 20 wt % of methoxytriethylenoxypropyl-functionalized sorbent; b) about 40-60 wt % of non-functionalized sorbent, about 40-20 wt % of biphenyl-functionalized sorbent, and about 30-10 wt % of methoxytriethylenoxypropyl-functionalized sorb ent; or c) about 30-70 wt % of non-functionalized sorbent, about 1-50 wt % of biphenyl-functionalized sorbent, and about 1-40 wt % of methoxytriethylenoxypropyl-functionalized sorbent.

In some embodiments, the functionalized sorbent of the invention exhibits increased uptake rate, slower rate of desorption, and decreased maximum uptake capacity as compared to the native non-functionalized sorbent.

The porous medium releases the adsorbed (captured or entrapped) volatile organic compound(s) (VOC) or semi-volatile organic compound(s) (SVOC) when the porous medium is exposed to heat or reduced pressure or organic solvent. The porous medium releases at least about 75%, at least about 80%, at least about 85%, at least about 90%, at least about 92.5%, at least about 95%, at least about 97.5%, at least about 99%, or all of the adsorbed VOC or SVOC when subjected to tests for quantitation of the adsorbed compound(s). In other words, the porous medium provides at least 75% recovery of VOC or SVOC. In some embodiments, the porous medium quantitatively releases the adsorbed compound(s).

The invention also provides a method of converting a detonable compound into a non-detonable form of that compound by adsorbing the detonable compound onto the sorbent of the invention.

In some embodiments, the porous medium stabilizes and protects adsorbed VOC and SVOC from decomposition for a period of at least about 30 days or more. Medium comprising adsorbed VOC or SVOC can exhibit a storage shelf-life of up to 3 mo, up to 6 mo, up to 9 mo, up to 12 mo, or more than 1 year in freezer storage, i.e. at a temperature of about 0° C. or less, about −10° C. or less, or about −20° C. or less.

The sorbent (porous medium) exhibits different affinities (adsorption capacity) for different classes VOC's or SVOC's differing in vapor pressure. The sorbent can be used to adsorb compounds having a vapor pressure ranging from very low (such as 0.013 kPa for naphthalene) to very high (such as 101 kPa for acetaldehyde). Accordingly, the sorbent (and corresponding device(s)) is suitable for adsorption of compounds having a vapor pressure ≥0.00002 mmHg.

Embodiments of the invention include those wherein the porous medium can adsorb compounds from one or more of the following classes of compounds: aromatic hydrocarbon, non-aromatic hydrocarbon, alkylhalide, alkylaldehyde, polar organic compound, non-polar organic compound, explosive, narcotic, controlled substance, illegal substance, industrial chemical, commodity chemical, pesticide, herbicide, poison, solvent, nitramines, pyrethroids, nitroaromatics, tetrazoles, organochlorines (e.g. PCB, PCDF, PCDD), PAHs, carbonyl compounds, fuels, chlorinated solvent, or other such materials.

More specific embodiments of the invention include those wherein the porous medium is functionalized with the following adsorption modifier(s) and exhibits enhanced affinity for respective organic volatile compounds included in the following table:

| Adsorption modifier | Enhanced affinity towards the following class(es) of volatile organic compound(s) |
|---|---|
| Biphenyl group | Fuels |
| Methoxytriethylenoxypropyl-group | Chlorinated solvents, carbonyl compounds |

Another aspect of the invention provides a method of capturing one or more volatile organic compounds (VOC) or semi-volatile organic compounds (SVOC) from a gaseous atmosphere, the method comprising:
exposing a mesoporous silica of the MCM-41 type (hexagonal) to an atmosphere comprising the one or more VOC and/or one or more SVOC, thereby capturing the one or more VOC and/or one or more SVOC.

Embodiments of the method include those wherein: a) the gaseous atmosphere is at ambient pressure and temperature; b) the gaseous atmosphere is at about 20-50° C. and about 265-1080 mbar; c) the mesoporous silica is non-functionalized; d) the mesoporous silica is functionalized; e) the mesoporous silica comprises non-functionalized mesoporous silica and one or more functionalized mesoporous silicas; f) the mesoporous silica is a silane functionalized mesoporous silica; g) the mesoporous silica is a defined herein.

In some embodiments, the invention provides a method (and device for said method) of providing plural samples of sorbent differing in exposure time limit, the method comprising:

providing a device comprising plural separate sections of sorbent, each section in a respective sealed receptacle;

unsealing a first receptacle comprising a first section of sorbent, exposing said first section to VOC or SVOC for a first period of time, and then sealing the first receptacle;

unsealing a second receptacle comprising a second section of sorbent, exposing said second section to VOC or SVOC for a second period of time, and then sealing the second receptacle; wherein the first and second receptacles can be unsealed at the same or different times.

Embodiments of the invention include those wherein a) the first and second receptacles are separately (independently) sealable; b) the first and second receptacles are separately (independently) unsealable; c) the first period of time is different than the second period of time; d) the first time period is the same as the second time period; e) both receptacles are unsealed at the same time; f) both receptacles are sealed at the same time; g) the receptacles are unsealed at different times; h) the receptacles are sealed at different times; i) the first period of time is less than the second period of time; j) the first period of time is greater than the first period of time; or k) a combination of any two or more thereof.

Embodiments of the invention also include those wherein the device a) is flexible and comprises one or more layers of flexible porous material; b) comprises one or more porous cartridges within which said sorbent in enclosed; c) comprises a flexible adhesive backing, which may be porous or non-porous; d) comprises a flexible mesh material; e) comprises one or more layers of flexible mesh material; f) comprises one or more non-porous cartridges within which said sorbent in enclosed; or g) a combination of two or more of the above embodiments. In some embodiments, said one or more cartridges are disposed between two or more layers of said device. A porous material is intended to encompass any material through which a VOC or SVOC can pass. Exemplary materials include mesh, fabric, porous foam, porous rubber or other such materials. The term flexible also encompasses bendable and pliable materials.

A more specific embodiment of the invention provides a flexible device comprising a flexible porous facing layer, a flexible porous intermediate layer, a flexible adhesive backing layer, and one or more porous sorbent-holding containers disposed between said facing layer and said intermediate layer. The device may further comprise one or more non-porous sorbent-holding containers. The device may further comprise attachment means. The device may further comprise VOC- or SVOC-impermeable packaging enclosing and sealing said device and/or said one or more sorbent-holding containers. The packaging may be present before and/or after use of said device. In some embodiments, said device is reusable and said one or more sorbent-holding containers are replaceable.

The invention also provides a device comprising a housing having a porous (or perforated) front, a non-porous (or non-perforated) back, at least one internal chamber defined by said housing, and one or more porous sorbent-holding containers within said internal chamber. The device optionally further comprises a casing and attachment means for removably attaching said device. The device optionally further comprises one or more porous sorbent-holding containers, said container(s) optionally being disposed within said internal chamber.

The invention also provides a flexible device for passive sampling of volatile organic compound or semi-volatile organic compound in air or gaseous environment, the device comprising a) a flexible facing layer; b) a flexible intermediate layer; c) a flexible backing layer comprising attachment means; and d) one or more sorbent-holding containers disposed between said facing layer and said intermediate layer, said containers retaining respective charges of sorbent; wherein said facing layer, said intermediate layer, and said one or more sorbent-holding containers are permeable to volatile organic compound (VOC) and/or semi-volatile organic compound (SVOC).

In some embodiments, a) said facing layer and said intermediate layer are independently selected upon each occurrence from a mesh, fabric, foam, material through which VOC or SVOC can pass, or any combination thereof; b) said device further comprises one or more non-permeable sorbent-holding containers comprising VOC- and SVOC-impermeable material defining a sealed chamber retaining a charge of sorbent; c) said device further comprises VOC- and SVOC-impermeable packaging material enclosing said device; d) said one or more porous sorbent-holding containers is replaceable; e) said device is reusable; f) said device further comprises VOC- and SVOC-impermeable packaging material enclosing said one or more sorbent-holding containers; g) said backing layer is non-permeable to VOC or SVOC; h) said backing layer is permeable to VOC or SVOC; i) one or more of said one or more sorbent-holding containers (along with its respective charge of sorbent) is replaced with a compressed article or loose powder comprising said sorbent; or j) a combination of any two or more of the above.

In some embodiments, a) said one or more sorbent-holding containers is flexible; b) said one or more sorbent-holding containers is independently selected upon each occurrence from the group consisting of cartridge, tube, wafer, pouch, sphere, or rod; c) said one or more sorbent-holding containers comprises PTFE (polytetrafluoroethylene); d) said intermediate layer comprises PTFE; e) said mesh comprises PTFE, polypropylene, PTFE-coated wire, and/or other material adapted for making a breathable mesh; f) said attachment means comprises hook-and-loop attachment, adhesive, or magnet; or g) a combination of any two or more of the above.

Another aspect of the invention provides a method of training an animal to sense (detect) one or more VOC or SVOC, the method comprising:

exposing a mesoporous silica of the MCM-41 type (hexagonal) to an atmosphere comprising the one or more VOC and/or one or more SVOC, thereby forming a compound-containing mesoporous silica; and exposing the animal to the compound-containing mesoporous silica.

Embodiments of the method include those wherein the method further comprises one or more of the following steps: a) hiding the compound-containing mesoporous silica before exposing the animal to it; b) placing the compound-containing mesoporous silica away from the animal; c) allowing the animal to search for the compound-containing mesoporous silica; d) rewarding the animal after it finds the compound-containing mesoporous silica; e) rewarding the animal when it detects compound released from the compound-containing mesoporous silica; f) selecting an animal that is inquisitive and responsive; g) introducing the animal to the test environment before exposing the animal to the compound-containing mesoporous silica; h) disciplining the animal for conducting undesirable behavior; i) having the animal bond with an animal trainer; j) reducing the amount of the animal's daily food ration during training; k) reducing or eliminating contaminants in the area (environment) in which training is being conducted; l) including in the training area one or more control containers or samples not including the compound adsorbed onto the mesoporous silica; m) employing verbal, audio and/or visual commands for the animal; or n) a combination of any two or more of the above. In some embodiments, the compound used in the training method comprises an explosive, narcotic, controlled substance, abusable drug, a regulated substance, an illegal substance or a derivative or precursor of any thereof.

The method of training is particularly suitable for training bomb-sniffing or drug-sniffing animals, particular those used by the armed services or law enforcement, e.g. explosives detecting dogs (EDD).

The sorbent and devices of the invention are also suitable for use as control or test samples in security screening procedures that employ devices that sense illegal or dangerous VOC or SVOC.

The invention also provides a non-detonable explosive-containing sorbent comprising one or more otherwise explosive materials or combination thereof adsorbed onto the sorbent. The explosive-containing sorbent can be employed in a device or method as described herein.

Embodiments of the invention include those wherein: a) the explosive-containing sorbent is non-detonable by impact, friction, heat or flame; b) the rate of release (desorption) of explosive from the explosive-containing sorbent simulates a detonable amount of explosive; c) explosive in the explosive-containing sorbent can be neutralized or degraded by exposure to elevated temperature above 50° C.; d) the explosive-containing sorbent exhibits a broad exotherm during differential scanning calorimetry (DSC) analysis; e) explosive in the explosive-containing sorbent can be neutralized or degraded by chemical treatment; or f) a combination of any two or more of the above.

The invention also provides a method of neutralizing an explosive-containing sorbent, the method comprising: a) providing one or more neutralizing agents; b) exposing the explosive-containing sorbent to the one or more neutralizing agents for a period of time, thereby neutralizing the explosive in the sorbent.

Embodiments of the invention include those wherein: a) the method further comprises mixing the one or more neutralizing agents with the explosive-containing sorbent; b) the exposing is conducted at a temperature range from 20-35° C.; c) the exposing is conducted at a pressure in the range from 970 mbar and 1040 mbar; d) the one or more neutralizing agents and the explosive-containing sorbent are in an aqueous fluid during said exposing; e) the aqueous fluid comprises water and one or more types of neutralization reagents selected from the group consisting of at least one organic acid, at least one surfactant, at least one sulfur-containing inorganic salt, at least one antioxidant, at least one oxidizing agent, and at least one reducing agent; or f) a combination of any two or more of the above.

The invention includes all combinations of the embodiments, sub-embodiments and aspects disclosed herein. Accordingly, the invention includes the embodiments and aspects specifically disclosed, broadly disclosed, or narrowly disclosed herein, as well as combinations thereof and subcombinations of the individual elements of said embodiments and aspects.

Other features, advantages and embodiments of the invention will become apparent to those skilled in the art by the following description, accompanying examples.

BRIEF DESCRIPTION OF THE FIGURES

The following figures form part of the present description and describe exemplary embodiments of the claimed invention. These drawings are not necessarily drawn to scale and are instead intended to illustrate the general principles of the invention as further described herein. Although specific embodiments are described below with specific reference to the drawings provided, other embodiments are possible without deviating from the spirit and scope of the present invention. The skilled artisan will, in light of these figures and the description herein, be able to practice the invention without undue experimentation.

FIG. 19 depicts an exploded view of an alternate device of the invention.

FIG. 22A is an exploded perspective view of the components of the disassembled device. FIG. 22B is a top plan view of the assembled device. FIG. 22C is a side elevation cross-sectional view of the components of the device.

FIG. 23A depicts a perspective view of the assembled device. FIG. 23B depicts a perspective view of the disassembled device.

DETAILED DESCRIPTION OF THE INVENTION

The invention provides improved silica-based sorbent(s) and use(s) thereof and devices containing the same.

The sorbent and devices of the invention provide numerous improvements over known sorbents and devices: a) improved sampling rates; b) improved stabilization and retention of VOC or SVOC during storage and handling at temperatures ranging from −20° C. to 35° C.; c) reduced degradation and/or desorption of VOC or SVOC; d) ability to conduct two different exposure tests with the same device; e) reduced or no organic contribution from sorbent during thermal desorption or solvent extraction analysis; f) ability to conduct analysis by two different methods, e.g. solvent extraction and thermal desorption, using sorbent from the same device; g) quantifiable analyte (VOC or SVOC) recovery of at least 90% for most compounds; h) low limits of quantitation; i) low limits of detection; and/or j) improved rate of adsorption of VOC or SVOC as compared to other sorbents.

As used herein, the term "OSU-6" is taken to mean non-functionalized mesoporous silica, the term "MP-OSU-6" is taken to mean methoxytriethylenoxypropyl-functionalized OSU-6, the term "OT-OSU-6" is taken to mean octyl-functionalized OSU-6, and the term "BP-OSU-6" is taken to mean biphenyl-functionalized OSU-6.

As used herein, the term "non-functionalized mesoporous silica" (or "non-functionalized sorbent") refers to mesoporous silica that has not been functionalized with one or adsorption modifiers.

As used herein, the term "sorbate" refers to VOC or SVOC captured by (or adsorbed by) the sorbent.

Figure 1A:
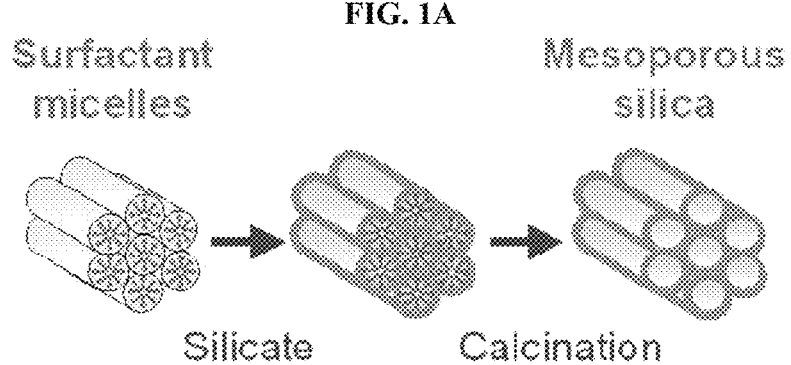
FIG. 1A depicts a generalized drawing of the structure of the mesoporous silica of the invention.
Figure 1B:
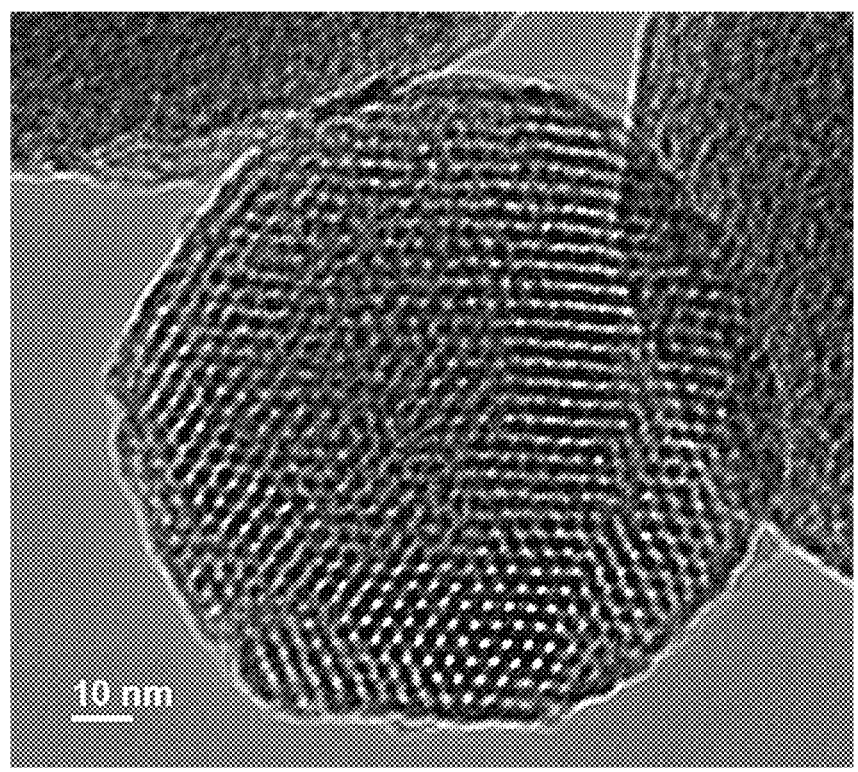
FIG. 1B depicts a TEM (transmission electron microscope) image of an end view of a mesoporous silica particle.

The mesoporous silica of the MCM-41 (hexagonal tubular pores structure) types exhibits a tertiary or quaternary structure characterized by stacked layers of hexagonally-shaped parallel tubes. FIG. 1 depicts a generalized rendition of its structure.

Embodiments of the invention include those wherein the porous medium is an improved grade of MCM-41 type mesoporous silica that possesses one or more, and preferably a combination of two or more, of the following properties:

| Property | Minimum value | Range of values |
| --- | --- | --- |
| Linear formula | $SiO_2$ polymer | |
| Form | powder | |
| Pore structure | Hexagonal tubes | |
| Pore size (diameter) | >2 nm | about 2 to about 30 nm |
| | | about 2 to about 15 nm |
| | | about 5 to about 10 nm |
| | | average about 8 nm |
| Pore volume | >0.5 cm$^3$/g | about 0.5 to about 2.0 cm$^3$/g |
| | | about 1.0 to about 2.0 cm$^3$/g |
| | | about 1.2 to about 1.7 cm$^3$/g |
| | | average about 0.5-0.7 ml/g |
| Surface area | at least 600 m$^2$/g and up to 900 m$^2$/g | about 600 to about 1000 m$^2$/g |
| | | about 700 to about 1000 m$^2$/g |
| | | about 800 to about 1000 m$^2$/g |
| | | greater than about 700 m$^2$/g |
| Channel wall thickness | >2 nm | about 2 to about 5 nm |
| | | about 2 to about 4 nm |
| | | about 2 to about 3 nm |

The grade of MCM-41 mesoporous silica of the invention exhibits a large pore size, a high pore volume, and, when compared to conventional grades of MCM-41, exhibits thicker channel walls, higher thermal stability (up to 950° C.), and higher hydrothermal stability (which is expressed in terms of changes to sorbent porosity after treatment in boiling water for more than 25 hours. In some embodiments, the mesoporous silica of the invention exhibits no, or less than 10%, or less than 5% change in sorbent porosity after treatment in boiling water for more than 25 hours. Preferred embodiments of the mesoporous silica are prepared according to the procedure of Example 1.

A generalized procedure for preparation of the mesoporous silica is as follows. A templating solution is prepared by mixing a templating material in water and agitating the mixture for form a substantially uniform foam or froth, which might appear to be a paste. A silica solution is formed by mixing tetraalkylorthosilicate in solvent (e.g. alcohol or mixture of alcohols). The templating solution is stirred and an acidic solution is added (incrementally or continuously) to it. To that mixture, the silica solution is added while mixing to form a precursor mixture. Water is then added to the precursor mixture while lightly mixing and that mixture is left standing for a period of days at room temperature. The mesoporous silicate is then separated from the supernatant and washed with water and then ethanol. A more detailed description for preparation of the mesoporous silica is provided in Example 1.

X-ray diffraction analysis of the OSU-6 depicts three well-resolved diffraction peaks in the region of 2Θ=1-5°, which can be indexed to the (100), (110) and (200) diffractions, characteristic of the formation of well-arranged hexagonal mesostructures.

The SEM (scanning electron microscopy) image of the OSU-6 shows a narrow particle size distribution and well-defined spherical particles. The mean average particle size of the OSU-6 was in the range of about 250 nm to about 1500 nm in diameter.

The TEM (transmission electron microscopy) image of the OSU-6 shows the presence of well-defined pore channels with diameters of about 5 nm (about 2 to about 30 nm) and wall thickness of about 2 nm about 1 to about 5 nm) in the particles.

Figure 2A:
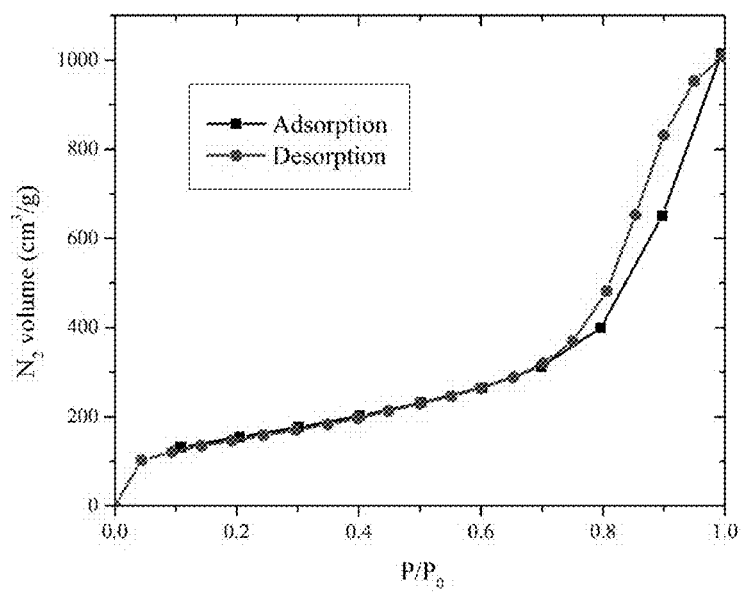
FIGS. 2A and 2B depict exemplary BET nitrogen adsorption-desorption isotherms for the non-functionalized (FIG. 2A) and methoxytriethylenoxypropyl-functionalized (MP-functionalized) mesoporous silica (FIG. 2B).
Figure 2B:
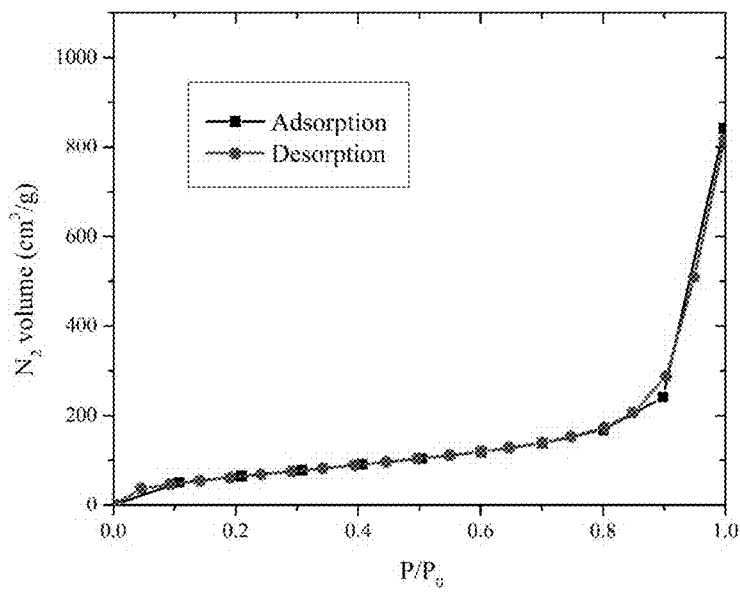

FIGS. 2A and 2B depict exemplary BET nitrogen adsorption-desorption isotherms for the non-functionalized (FIG. 2A) and methoxytriethylenoxypropyl-functionalized (MP-functionalized) mesoporous silica (FIG. 2B). Adsorption/desorption isotherms are used to characterize the surface area, pore volume, and pore size distributions of the sorbent. The non-functionalized sorbent (FIG. 2A) contains type IV isotherms, which are associated with the capillary condensation of adsorbate into mesopores, while the observed hysteresis of type A indicates that OSU-6 pores have cylindrical shapes. After functionalization (FIG. 2B), the hysteresis disappears, and the adsorption-desorption isotherms assumed the shapes of type II isotherms due to the attachment of functional groups to the pore walls.

The mesoporous silica can be non-functionalized or functionalized. In some embodiments, the porous medium, such as mesoporous silica, is functionalized with one or more adsorption modifier functional groups that enhance the binding of a VOC or SVOC. For example, the mesoporous silica is functionalized by treating it with a trialkoxyalkylsilane ($R^1Si(OR^2)_3$), wherein:

$R^1$ is selected from the group consisting of aromatic group, alkyl group, oxygen-containing alkyl groups, sulfur-containing alkyl groups, nitrogen-containing alkyl groups, phenyl, biphenyl, (C1-C8)-alkyl, methyl, ethyl, propyl, butyl, pentyl, hexyl, heptyl, octyl, methoxytriethyleneoxypropyl, alkoxyalkyleneoxyalkyl, haloalkyl, halo-(C1-C8)-alkyl, aminoalkyl, alkoxyalkyl, polyaromatic, toluyl, fluoroalkyls, fluroaromatics, and their combinations; and $R^2$ is selected from the group consisting of alkyl, C1-C12-alkyl, with methyl, ethyl, and propyl being preferred, thereby forming a silane-functionalized mesoporous silica comprising plural silane groups $R^1Si$-covalently bound to oxygen molecules of the mesoporous silica.

Exemplary trialkoxy silanes (or trialkoxy alkylsilanes) include:

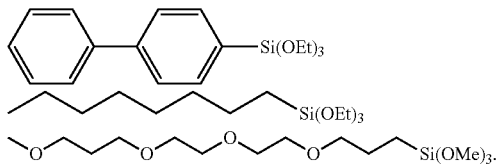

Such a silane-functionalized mesoporous silica generally has the following chemical formula: silica-O—Si($R^1$)($OR^2$)$_n$—O$_m$—; wherein n is 0, 1 or 2, and m is 2, 1, or 0, respectively. Functionalization of the mesoporous silica converts the silicon oxide/hydroxide surface within the pores of the mesoporous silica into the desired derivatives by formation of an organosilsequioxane polymer grafted to the surface of the silica.

Its high surface area allows the sorbent to uptake relatively large amounts of VOC and SVOC. The sorbent exhibits exceptional adsorption capacity, rate of capture and a high propensity to stabilize even compounds such as acetaldehyde and methylene chloride. After adsorption of VOC or SVOC, the sorbent can be introduced directly into the sample chamber of an analytical instrument, e.g. gas chromatograph and/or mass spectrometer, if desired, for rapid quantitation and/or identification of the adsorbed VOC or SVOC. In some embodiments, the sorbent retains an adsorbed VOC or SVOC even after exposure of a VOC-containing or SVOC-containing sorbent to a temperature of up to about 40° C., up to about 45° C., or up to about 50° C. for a period of up to about a week (which was observed for compounds with relatively high maximum desorption temperatures such as 1,2,4-trimethylbenzene and naphthalene).

Functionalized mesoporous silica can be made according to the following generalized procedure. Non-functionalized mesoporous silica is rendered anhydrous by removal of substantially all moisture, such as by azeotropic distillation and/or desiccation with or without heat and at atmospheric or reduced pressure. For example, the mesoporous silica is refluxed in dry organic liquid under dry atmosphere to remove moisture. The organic liquid is removed from the mesoporous silica by drying under heat at reduced pressure. The dried mesoporous silica is suspended in organic liquid and treated with triethanolamine (TEA) at room temperature to form TEA-mesoporous silica (TEA-MS). The TEA-MS solids are then separated from the supernatant. The recovered TEA-MS solids are washed with dry organic liquid, and optionally vacuum-dried. The TEA-MS is suspended in organic liquid and treated with functionalizing agent while heating and mixing. The functionalized mesoporous silica (MS) is separated from the supernatant and washed with organic liquid. Functionalization was performed according to Example 2.

Functionalized sorbent may exhibit different performance properties than non-functionalized sorbent. Example 9 describes the results of a study comparing the uptake capacities and uptake rates for four different sorbents. The data indicate that the uptake capacity of the sorbent decreases with surface functionalization which is mainly due to reduced surface area; however, an advantageous increase in the rate of uptake for specific target compounds was observed for the functionalized mesoporous silica.

The sorbent can comprise (or consist essentially of or consist of) non-functionalized sorbent, functionalized sorbent, or a combination (mixture) of non-functionalized sorbent and functionalized sorbent. In some embodiments, the sorbent comprises non-functionalized mesoporous silica, functionalized mesoporous silica, or a mixture of non-functionalized mesoporous silica and one or more functionalized mesoporous silicas. In some embodiments, non-functionalized sorbent comprises the majority of the mixture. In some embodiments, functionalized sorbent comprises the majority of the mixture. In some embodiments, non-functionalized sorbent and functionalized sorbent are present at about the same amount.

The weight ratio of non-functionalized sorbent to functionalized sorbent can range from about 1:100 to about 100:1 with all integer and fractional values therein being contemplated. In some embodiments, the ratio ranges from about 80:20 to about 20:80, about 70:30 to about 30:70, about 60:40 to about 40:60, about 80:20 to about 40:60, about 80:20, about 95:5, about 90:10, about 70:30, about 60:40, about 50:50, about 40:60, about 30:70, about 20:80, about 90:10, or about 95:5.

Exemplary suitable ranges for the weight percentage of the different types in the mixture can be as follows, wherein the sum total of the weight percentages is 100%.

| Non-functionalized sorbent (% wt) | 1$^{st}$ Functionalized sorbent (% wt) | 2$^{nd}$ Functionalized sorbent (% wt) |
|---|---|---|
| 100 | 0 | 0 |
| about 80 or less | up to about 10 | 10 |
| about 75 or less | up to about 15 | up to about 10 |
| about 50 or less | up to about 30 | up to about 20 |

-continued

| Non-functionalized sorbent (% wt) | 1st Functionalized sorbent (% wt) | 2nd Functionalized sorbent (% wt) |
|---|---|---|
| about 5 to less than 100 | up to about 95 | 0 |
| up to about 95 | about 5 to less than 100 | 0 |
| [a] about 5 to less than 100 | less than about 95 | less than about 95 |
| [b] less than about 95 | about 5 to less than about 100 | less than about 95 |

[a] wherein the total of 1st and 2nd functionalized sorbent is up to 95% wt.
[b] wherein the total of non-functionalized and 1st functionalized sorbent is up to 95% wt.

Mixtures of non-functionalized mesoporous silica and one or more functionalized mesoporous silicas can be made according to Example 4, whereby two or more different types of mesoporous silica are mixed together. Such mixtures may exhibit different affinity (loading capacity) for the sorbate.

Example 9 provides a comparison of the uptake capacity for various mixtures of sorbent. As the sorbent is functionalized, the maximum uptake capacity decreases; however, the rate of capture is not necessarily decreased. In some embodiments, the functionalized sorbent of the invention exhibits increased uptake rate, slower rate of desorption, and decreased maximum uptake capacity as compared to the native non-functionalized sorbent.

The sorbent can be provided in forms such as compressed, non-compressed, pellet, tablet, disc, beads, loose powder, bound powder, powder enclosed in porous container, powder in sachet or bag, thin film. The sorbent may or may not be affixed (attached, bound) to a substrate.

The invention also provides a method of adhering sorbent to a substrate, the method comprising: a) suspending the sorbent in organic liquid to form a suspension; b) depositing the suspension to a substrate; and c) removing the organic liquid, thereby leaving the sorbent adhered onto the substrate. In some embodiments, the substrate comprises silica, silicate or inorganic crystal. The substrate can be activated by heat and/or chemical treatment prior to adherence of the sorbent.

Materials suitable for making substrates to which the sorbent is affixed include glass fibers and monoliths, plastic fibers and monoliths, fabric threads and woven fibers, paper, and metal fibers and monoliths with fluoropolymer (e.g PTFE) or glass fibers and monoliths being preferred. Such material will generally be inert and will not adsorb or capture VOC or SVOC.

The porous medium can adsorb many different types of compounds, including but not limited to: aromatic hydrocarbon, non-aromatic hydrocarbon, alkylhalide, alkylaldehyde, polar organic compound, non-polar organic compound, explosive, narcotic, controlled substance, illegal substance, industrial chemical, commodity chemical, pesticide, herbicide, poison, solvent, or other material.

Exemplary explosives include, by way of example and without limitation, PETN (pentaerythritol tetranitrate), RDX (1,3,5-trinitro-1,3,5-triazinane), TNT (2,4,6-trinitrotoluene), TATP (triacetone triperoxide; tricyclic acetone peroxide), HMTD (hexamethylene triperoxide diamine; 3,4,8,9,12,13-Hexaoxa-1,6-diazabicyclo[4.4.4]tetradecane), nitroaromatics, DNT (2,4-dinitrotoluene), 1,3,5-trinitrobenzene, nitroamines, octahydro-1,3,5,7-tetranitro-1,3,5,7 tetrazocine (high melting explosive or HMX), nitroguanidine, tetryl, nitrate-based explosesive, urea nitrate, ammonium nitrate, peroxide-based explosives, triacetone triperoxide (TATP), or others.

An explosive compound adsorbed or entrapped by the sorbent becomes non-detonable by heat, flame, impact or friction. The invention thus provides a method of converting a detonable compound into a non-detonable form of that compound by adsorbing the detonable compound onto the sorbent of the invention.

The rate of desorption of explosive from the sorbent during use as a training aid is sufficiently high to permit detection of the explosive by an animal and sufficiently low to prevent detonation of the explosive.

Exemplary narcotics, controlled substances, or illegal substances include, by way of example and without limitation, Schedule I Controlled Substances such as heroin, LSD, marijuana, peyote, and ecstasy, Schedule II Controlled Substances such as Dilaudid, methadone, Demerol, OxyContin, Percocet, morphine, opium, codeine, amphetamine (Dexedrine, Adderall), and methamphetamine Schedule III Controlled Substances such as Vicodin, Codeine, Suboxone, ketamine, and anabolic steroids. Schedule IV Controlled Substances include Xanax, Soma, Klonopin, Valium, Ativan, Versed, Restoril, Halcion or others.

Exemplary industrial or commodity compounds include, by way of example and without limitation, solvent(s), 1,1,2,2-tetrachloroethane, Acetic acid, Acetone, Aroclor 1221, Benzylchloride, Carbon tetrachloride, Chlorobenzene, Chloroform, Chloropyrifos, Chrysene, Decalin, Dibenzofuran, Diethyl Ether, Ethanol, Ethylene oxide, Formic acid, Glutaraldehyde, Halothane, Hexadecane, Isoflurane, Isopropanol, Lindane, Malathion, Methanol, Methyl ethyl ketone, Methyl methacrylate, Naphthalene, Nitromethane, O-phtalaldehyde, PCB-209, Pyrene, Pyridine, Resmethrin, Styrene, Tetrahydrofuran (THF), Xylene (+Toluene), Aniline, Bifenthrin, Bisphenol A, Chloroxylenol, Cidex (O-phtalaldehyde), Desflurane, Dibutyl phthalate, Ethylbenzene, Hexachlorobenzene, Lindane, Perchloroethylene, Pyrene, Tricresylphosphate, 1,2,4-Trimethylbenzene, Acetaldehyde, Acrolein, Benzene, Hexane, Methylene Chloride, Napthalene, Vinyl Acetate, Xylene, 1,2,3,4-tetrazole, 5-aminotetrazole, Dichlorovos, Octane, PCB 209, Permethrin, RDX, TNT, Trichloroethylene, 1,1,2-trichloroethane, 1,2,-dichlorotetrafluoroethane, acetaldehyde, acetone, acetonitrile, Acrolein, acrylonitrile, crotonaldehyde, ethyl alcohol, formaldehyde, freons, isopropyl alcohol, methyl ethyl ketone, methyl isobutyl ketone, methylene chloride, Mono Ethyl Amine, Nitrogen Dioxide, Ozone, polychlorinated biphenyls. The invention includes other compounds not listed herein but having the ability to adsorb onto and desorb from the medium of the invention.

Figure 4A:
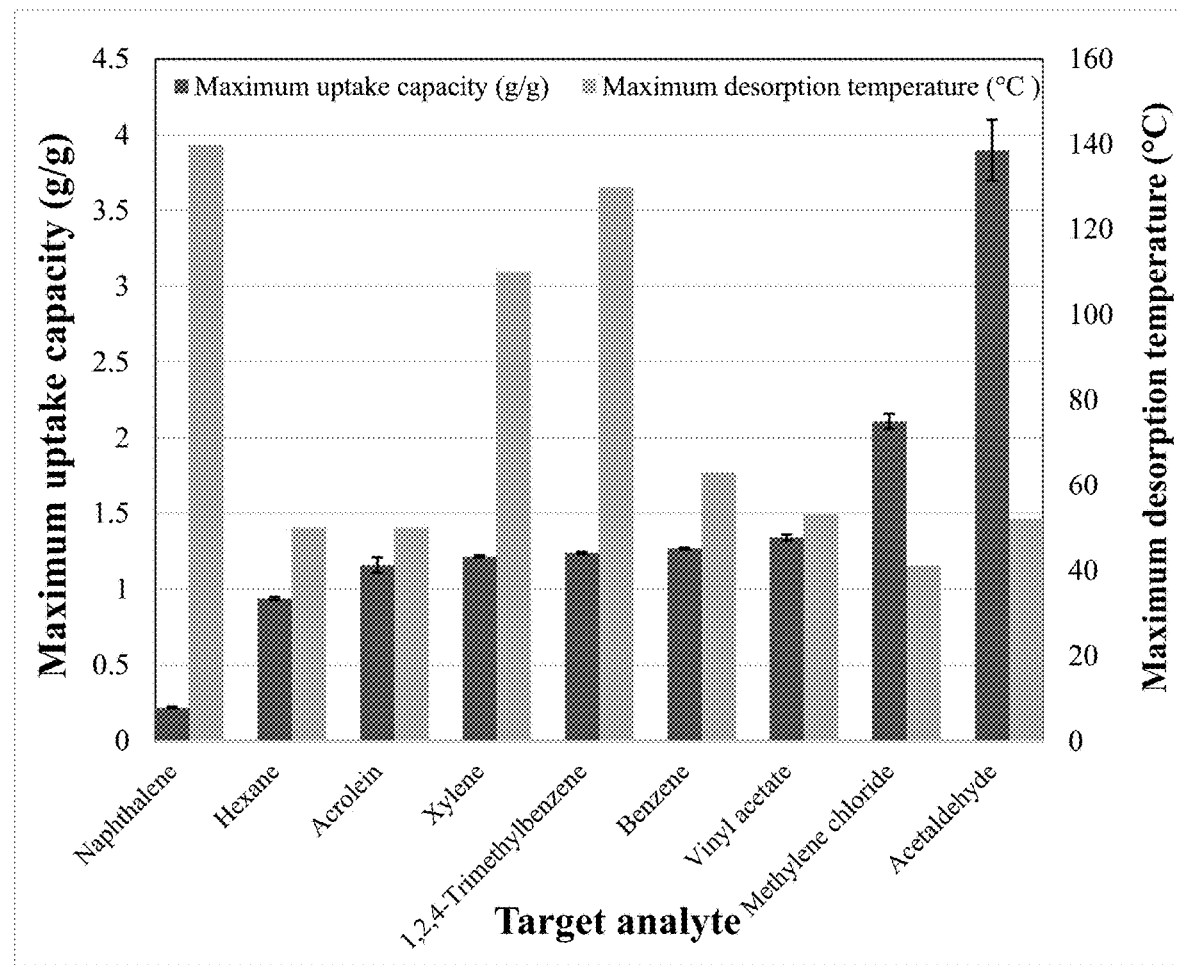
FIGS. 4A and 4B depict charts summarizing the measured uptake capacities and the maximum desorption temperature for the target analytes (VOC or SVOC) from the surface of the improved non-functionalized mesoporous silica MCM-41 type of the invention. Analyte uptake capacities and maximum desorption temperatures determined for non-functionalized XploSafe sorbent and select target analytes (VOC or SVOC) are provided.
Figure 4B:
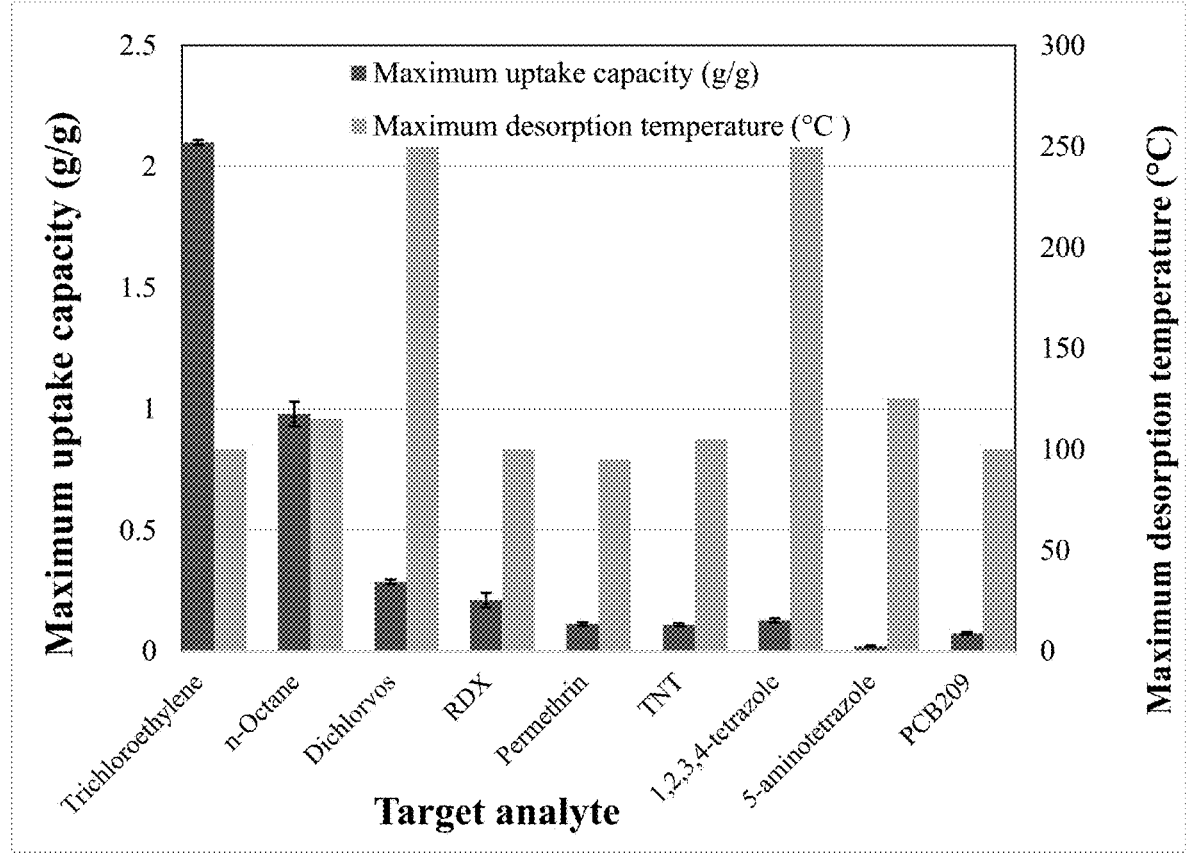

The uptake or loading capacity of the sorbent of the invention for VOC or SVOC was evaluated. FIGS. 4A and 4B depict charts summarizing the measured uptake capacities and the maximum desorption temperature for the target analytes (VOC or SVOC) from the surface of non-functionalized mesoporous silica (NFMS) of the invention. NFMS exhibits a high desorption temperature for aromatic hydrocarbons, such as naphthalene, xylene and 1,2,4-trimethylbenzene, and it exhibits a high uptake capacity for aldehydes, such as acetaldehyde. For the majority of target compounds with medium and high vapor pressure, the NFMS of the invention is able to uptake (capture, adsorb) at least about 1-fold its weight of VOC or SVOC.

The uptake capacities were obtained for a wide range of compounds on the surface of the functionalized OSU-6 sorbent. For all the studied compounds, the uptake capacities for the functionalized sorbents were slightly lower than those obtained for non-functionalized OSU-6 (mainly due to the reduction of the sorbent surface area after functionalization); however, the related adsorption rates were higher for the majority of the studied compounds, because of the possible chemical interactions between sorbate species and the surface functional groups. This effect was more pronounced for volatile compounds with relatively high vapor pressures such as methylene chloride, acetaldehyde, and hexane. For example, for hexane the rate constant value increased from 0.070 $h^{-1}$ (for non-functionalized OSU-6) to 0.092 $h^{-1}$ (for octyl-functionalized OSU-6) and to 0.11 $h^{-1}$ (for biphenyl-functionalized OSU-6) since the non-polar hexane chains interact more actively with the non-polar biphenyl- and octyl-functional groups than with the non-functionalized OSU-6 surface.

Performance of the mesoporous silica of the invention was compared to literature reported values for uptake capacity of activated carbon. The results are depicted in the table below.

| # | Class | Target compound | XploSafe sorbent uptake capacity (mg/mg sorbent) | Activated carbon uptake capacity (mg/mg sorbent)** |
|---|---|---|---|---|
| 1 | Polynuclear Hydrocarbons (PAHs) | Naphthalene | 0.221 ± 0.006* | >0.056 |
| 2 | Carbonyl Compounds | Vinyl acetate | 1.34 ± 0.02 | 0.02 |
| 3 | Fuels | Hexane | 0.94 ± 0.01 | 0.053 |
|   |   | Octane | 0.98 ± 0.05* | 0.056 |
|   |   | Xylene | 1.216 ± 0.008 | >0.056 |
|   |   | Benzene | 1.268 ± 0.006 | 0.049 |
| 4 | Chlorinated solvents | Trichloroethylene | 2.10 ± 0.01 | >0.056 |

*Measured for 6-mm sorbent pellets
**Estimated using the data from literature (https://www.assaytech.com/sampling-guide).

Accordingly, the sorbent of the invention, and devices containing it, substantially outperform activated carbon as a sorbent.

The uptake capacity of the sorbent is such that it can adsorb very low to very high amounts of target compounds. In some embodiments, the content of compound loaded onto the sorbent ranges from about 0.001 to about 200 wt. % following 8-hr exposure to compound, or from about 0.001 to about 0.5 wt % following 15-min exposure to compound, based upon the initial sorbent weight. In some embodiments, the sorbent adsorbs at least about 0.005-fold its weight and up to about 2-fold its weight of target compound. In some embodiments, the sorbent adsorbs undergoes a weight increase of at least about 0.1%, at least about 0.5%, at least about 1%, at least about 5%, at least about 10%, at least about 20%, at least about 30%, at least about 40%, at least about 50%, at least about 60%, at least about 70%, at least about 80%, at least about 90%, at least about 100%, at least about 125%, at least about 150%, at least about 175%, or at least about 200% when sorbate is adsorbed onto the sorbent.

Figure 5:
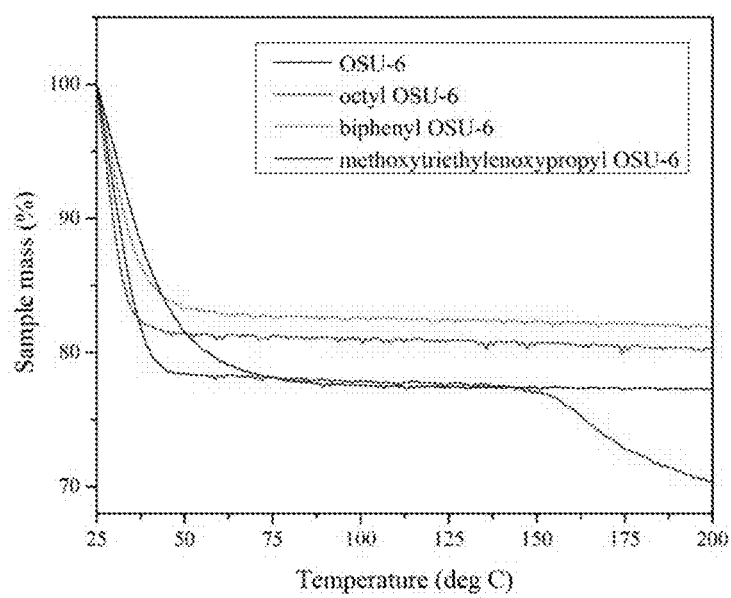
FIG. 5 depicts an exemplary thermograph for desorption of benzene from various different sorbents.

Knowledge of the desorption temperature of particular VOC or SVOC from the sorbent can be used to develop proper storage conditions for sorbents loaded with the respective compound(s). FIG. 5 depicts an exemplary thermograph for desorption of benzene from various different sorbents. The data were obtained according to Example 7. FIGS. 4A and 4B depict charts summarizing the observed maximum desorption temperature for the target analytes (VOC or SVOC) from the surface of the improved non-functionalized mesoporous silica MCM-41 type of the invention. Above the desorption temperature, the sorbate is thermally desorbed from the sorbent as evidenced by the decrease in sorbent weight and constant sorbent weight as the temperature increases.

The data indicate that the majority of the studied analytes are retained at the sorbent surface at temperatures below about 40° C., below about 45° C., or below about 50° C. In addition, the physical adsorption energy for the target compounds inside the pores appears to correlate with their vapor pressure since the analytes with relatively low vapor pressures (for example, xylene, 1,2,4-trimethylbenzene, and naphthalene) desorb from the non-functionalized and functionalized sorbates at much higher temperatures.

The sorbent employed in the invention comprises a porous medium that captures and stabilizes VOC and SVOC sorbate under ambient conditions and exhibits a desorption temperature of about 50° C. or higher for the VOC or SVOC. Example 10 provides the experimental procedure for sampling rate analysis. 15-Min and 8-hour exposure of target compounds at OSHA personal exposure limits (PEL) were obtained for sorbent. Effective sampling rates were obtained at $\frac{1}{10}^{th}$ and 10-fold OSHA PEL. The sorbent and devices of the invention provide equivalent or improved sampling rates as compared to reported literature on known devices. In preferred embodiments, the sorbent and devices of the invention provide sampling rates as described herein.

In view of the desorption temperature data, we conclude that RT storage (below 30° C.) and long storage times are possible. This is consistent with experimental studies.

By way of example, two dosimeters prototypes (clip-on flat badge form and vertical tubular badge form) were designed and 3D-printed. The dosimeters were modeled with 3D CAD software in order to rapidly generate workable prototypes that were used to perform "field tests".

Figure 6A:
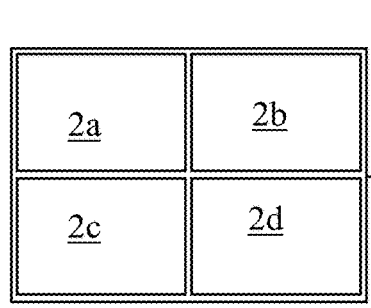
FIG. 6A depicts a top plan view of a device comprising plural uniform sections of sorbent on a surface.

FIG. 6A depicts a device (1) comprising plural sections (2a-2d) of sorbent on a substrate (3). Each section comprises about the same amount of sorbent. The sections can be independently sealed and unsealed so as to permit varying levels of exposure time periods with a single device.

Figure 6B:
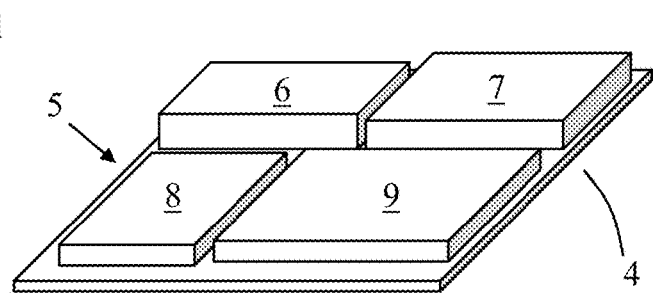
FIG. 6B depicts a perspective of an alternative device comprising plural different sections of sorbent on a surface.

FIG. 6B depicts a device (5) comprising plural sections (6-9) of sorbent on a substrate (4). Two or more of the sections comprise different amounts of sorbent. The sections can also be independently sealed and unsealed so as to permit varying levels of exposure time periods with a single device.

The sectioned devices (1, 5) can be used to provide plural sorbent samples having the same exposure to (content of) VOC or SVOC. In preferred embodiments, the device comprises 2-4 sections of sorbent. Such a device allows a user to obtain samples for different exposure time limits from a single device, e.g. one or more of the sections undergo exposure according to a first period having a first time limit, and one or more of the sections undergo a exposure according to a second period having a different second time limit. For example, one or more sections can undergo a 15-min time limit exposure, one or more sections can undergo an 8-hr time limit exposure. Moreover, a device having plural sections of sorbent can provide samples that can be analyzed by different techniques.

Figure 8:
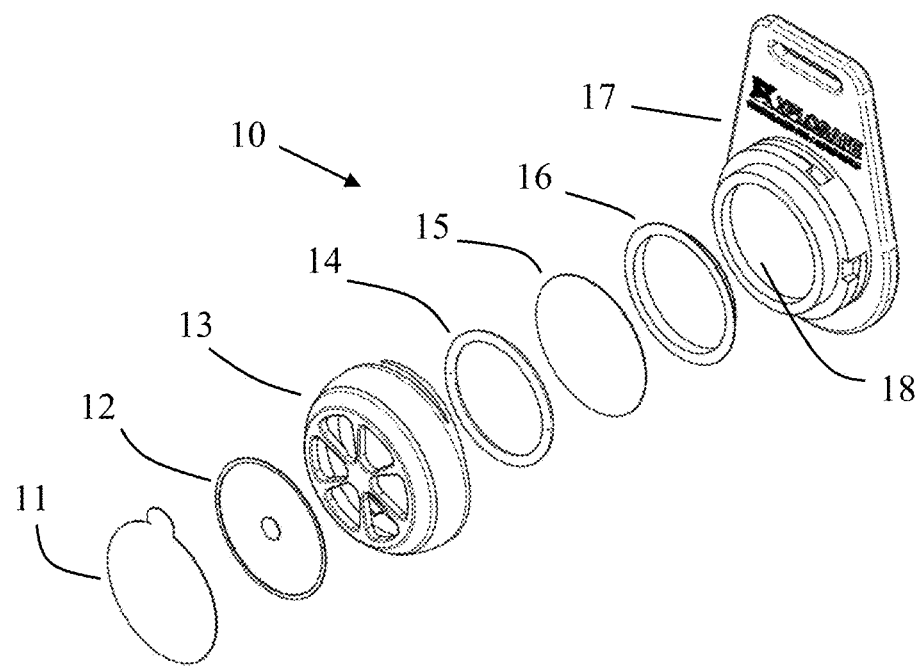
FIG. 8 depicts an exploded view of an alternative device of the invention.
Figure 9A:
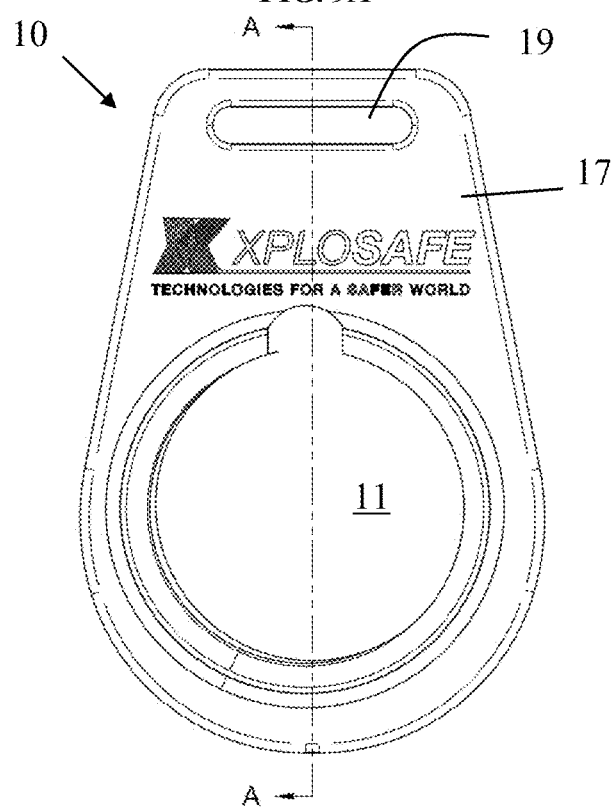
FIG. 9A depicts a front elevation view of the device of FIG. 8.
Figure 9B:
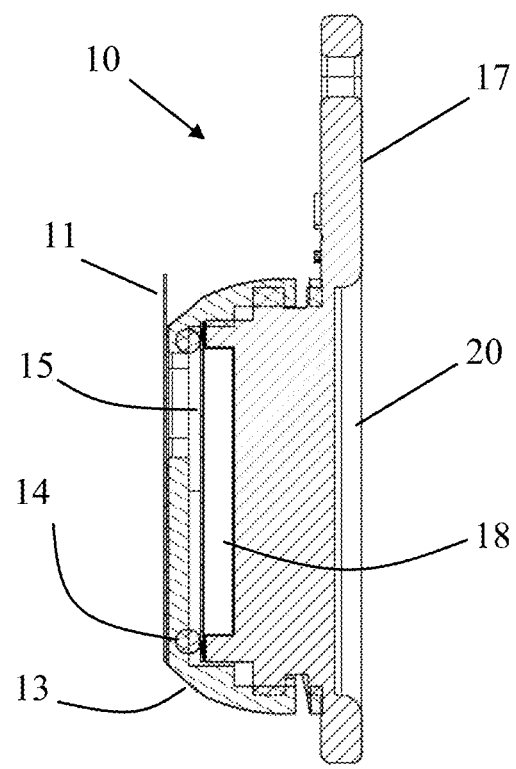
FIG. 9B depicts a cross-sectional side elevation view of the device of FIG. 9A along sectional view line A-A.

The dosimeter (10) of FIGS. 8, 9A and 9B is a clip-on style badge dosimeter comprising a removable impermeable membrane or cover (11), cap (12) with port, diffuser (13) with ports, o-ring (14), protective mesh cover (15), retainer ring (16), body (17). The body comprises one or more cavity (18) for placement of sorbent. In this particular embodiment, the cap is engaged to the body threaded engagement means; however, any other means are suitable, e.g. snap-fit, threaded. The dosimeter optionally further comprises mounting means for attaching the dosimeter to another object during use or storage.

The body can be molded from a non-reactive material (meaning a material that does not react with the target VOC or SVOC. The non-reactive material can be a polymer, which can be a plastice. The cavity can be covered with a permeable cavity covering to facilitate replacement and subsequent analysis of the exposed sorbent. Thus, users can simply replace the utilized sorbent cavity with a fresh adsorbent pack and reuse the rest of the badge. The sorbent is secured inside the badge by using an O-ring (suitable material is Viton®) (blend of synthetic rubber and fluoropolymer elastomer), which minimizes exposure of the sorbent. Undesired exposure of the sorbent is achieved using a removable impermeable cap covering (11), e.g. a sheet made from fluorinated plastic sheets such as Kynar® PVDF or Tedlar® PFA. The easy-to-peel cap covering can be secured with adhesive or can be sonically welded to the cap. Three prototype clip-on badges (with dimensions of 55.0×35.6× 14.6 mm) for initial testing were three-dimensionally printed using laser-sintered nylon provided by Shapeways.

The sorbent material cavity, housing thickness, and exposure aperture could be optimized to facilitate maximum vapor exposure (diffusion) during use and to prevent vapor loss (effusion) during storage and while en route for analysis.

Figure 14:
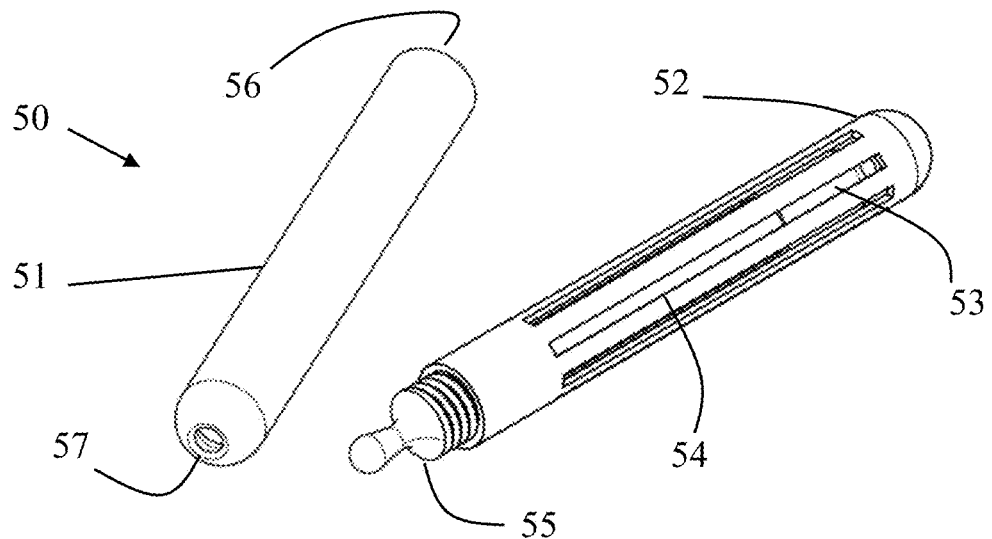
FIG. 14 depicts a perspective view of a partially disassembled alternate device of the invention.

Field tests were conducted according to Example 1 on dosimeter badges prototypes of FIGS. 8 and 14 by exposing them to vanillin vapors. The vapors originated from four open containers of 3" in diameter that contained 2 g of pure vanillin powder placed inside an office room with dimensions of 15'×17'×7.5'. Two different experiments were conducted for 15 min and 8 h, corresponding to the standard short-term and long-term OSHA exposures. The maximum vanillin concentration in air corresponding to that of its saturated vapor is very low and is equal to 0.16 ppm. The sorbent from the dosimeter badge exposed to vanillin was analyzed by a mass spectrometer.

The dosimeter exposed to the air containing vanillin vapor for 8 hours exhibited two characteristic mass spectrometry peaks at m/z=151 and 152 with the peak ratio identical to that of pure vanillin vapor. While the dosimeter exposed for 15 minutes recorded significantly lower amounts of vanillin vapor, it is consistent with the very low pressure of vanillin vapor at room temperature. For sorbent sample exposed to vanillin vapor for 8 hours, the adsorbed vanillin content measured was below 0.5 µg, which corresponds to the estimated sampling rate of around 1 mL/min. This value was very close to the magnitudes obtained for other target compounds with low vapor pressures (for example 1,2,4-trimethylbenzene and xylene), indicating the technical feasibility of the dosimeter's application to provide exposure-monitoring data for long-term monitoring of non-volatile compounds with extremely low vapor pressures.

To capture the widest range of analytes based on their vapor concentrations in air (volatile versus non-volatile compounds), the sorbent surface exposure in a dosimeter can be adjusted. For example, in longer exposures to target compounds with relatively high vapor pressures, the exposed area should be minimized in order to prevent early sorbent saturation, while at shorter exposure durations (especially for analytes with low vapor pressures), the exposed sorbent area should be as high as possible. This can be achieved by varying the number of exposure ports/slits in the dosimeter cover, effectively varying the exposed fraction of the sorbate to the environment by controlling the number of port open.

Figure 10:
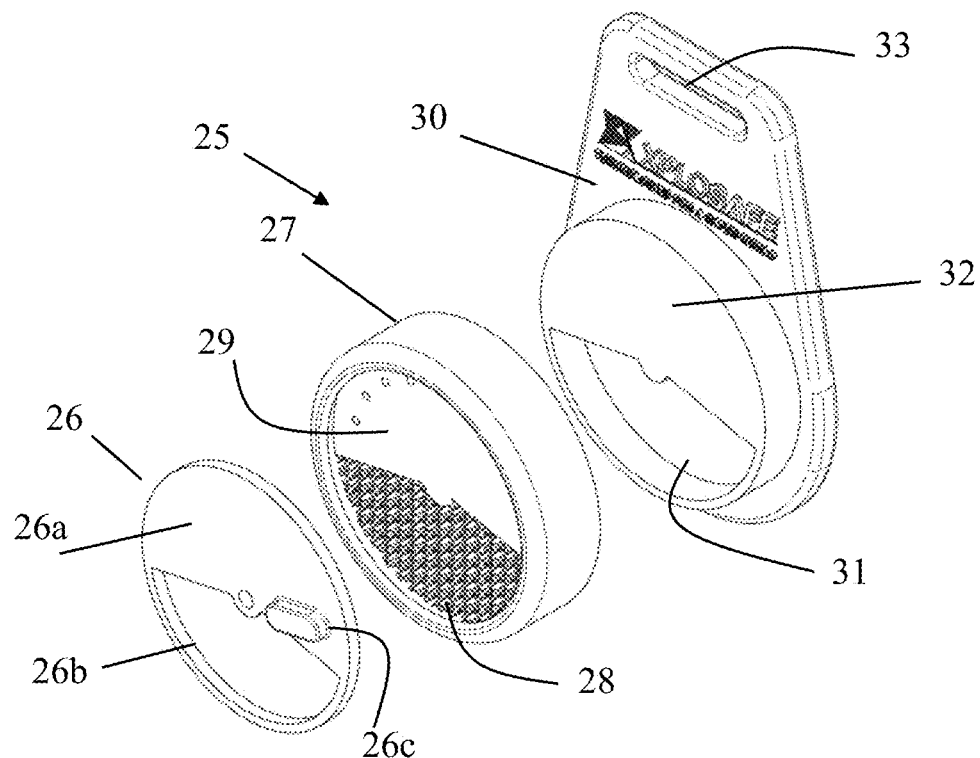
FIG. 10 depicts an exploded view of an alternative device of the invention.

The device (25) of FIG. 10 is an alternate embodiment of the dosimeter, which is of a circular badge format. It comprises a body (30) having at one or more cavities (31), each of which is adapted to retain sorbent or a substrate comprising sorbent. The body can comprise a partial cover (32) for the cavity. The dosimeter further comprises a diffuser (27) engaged to the body. The diffuser comprises plural ports having mesh-type or lattice-type coverings (28, which may or may not be integral with the cap). The dosimeter further comprises a cover (26) engaged with the cap and slidable in relation to the cap, whereby it can be moved to cover or uncover one or more ports of the cap. The cover comprises one more ports (26b) and one or more lids (26a). The ports provide exposure of the diffuser to the atmosphere and the lids block exposure of the diffuser to the atmosphere.

The sorbent can be placed in the cavity in any form desired, but if it is included as a powder, then the ports of the cap will comprise generally comprise a porous, permeable or perforated cover to help retain the sorbent within the cavity(ies). The sorbent can also be placed as a powder in a sachet or porous bag, in which case the covering of the ports is optional. When fully assembled and before deployment for use, the cavity(ies) are sealed and isolated from the outer environment, thereby avoiding contamination of the sorbent. During use, the cover is moved/slid/rotated, and the sorbent is exposed to the atmosphere. After use, the cover can be used to reseal the badge for storage. As needed, one or more of the portions (sections) of sorbent are then removed from the dosimeter and subject to analytical testing for quantitation of captured VOC and SVOC.

Figure 11A:
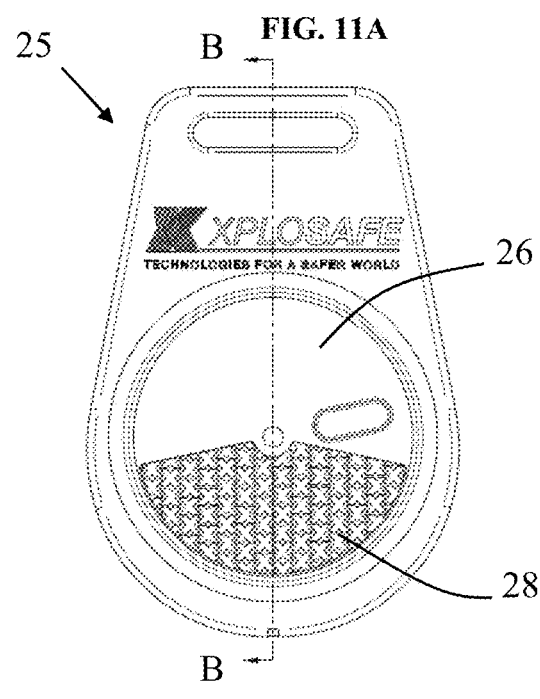
FIG. 11A depicts a front elevation view of the device of FIG. 10.
Figure 11B:
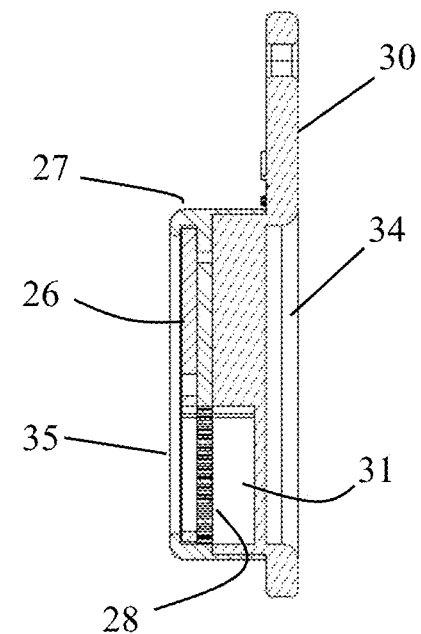
FIG. 11B depicts a cross-sectional side elevation view of the device of FIG. 11A along sectional view line B-B.

FIGS. 11A and 11B depict perspective views of the device (10) of FIG. 10. In FIG. 11A, the cover (16) is covering the three ports of the cap (13). In FIG. 11B, the cover has been slid away from the ports, thereby leaving them uncovered and exposed to the atmosphere. The body (30) comprises a rear face optionally comprising one or more holes to provide communication between the cavity (31) and the environment. Those one or more holes may also be covered with a removable cover. The removable cover (35) can be used to seal the diffuser and thus the sorbent containing cavity(ies).

Figure 12:
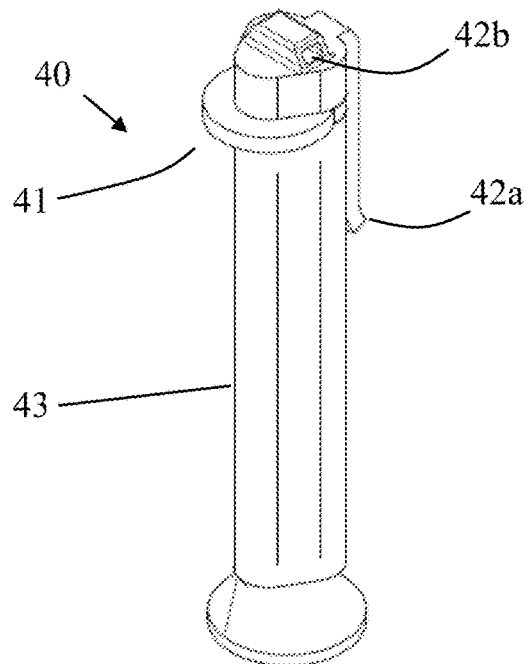
FIG. 12 depicts a perspective view of an alternative device of the invention.

FIG. 12 depicts a perspective view of an alternate dosimeter (40), which is of a rod/tube or pen/cartridge type format, comprising a hollow body cover (43) engaged to a capture assembly (41). The dosimeter optionally further comprises a fastener (42a, e.g. a clip), whereby the dosimeter can be attached to another object or person during use and/or storage. The dosimeter optionally further comprises a receptacle (42b) adapted to receive a fastener or holder (not shown).

Figure 13A:
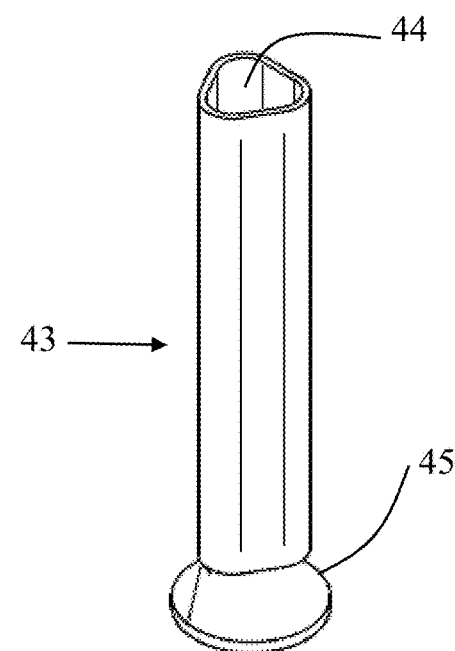
FIGS. 13A-13C depict perspective views of some of the components of the device of FIG. 12.
Figure 13B:
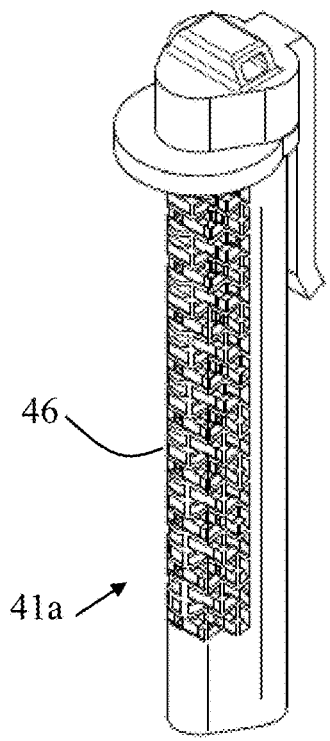
Figure 13C:
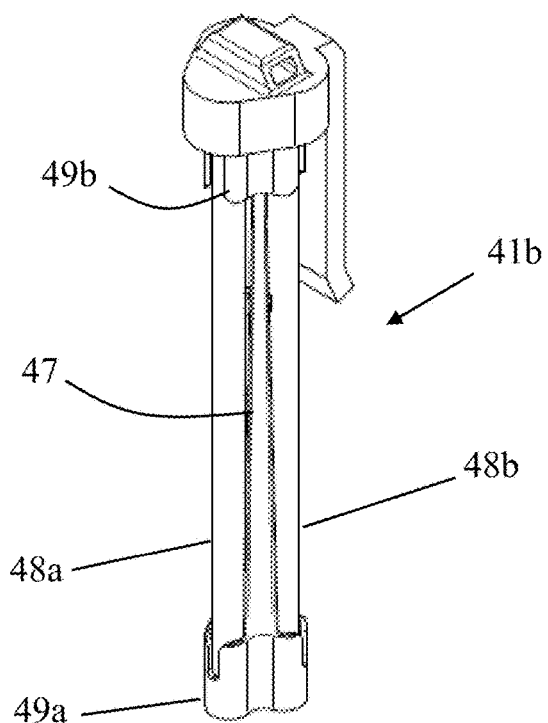

The hollow body cover (43, FIG. 13A) comprises an opening (44) and an optional pedestal (base) (45). The cover is adapted to receive and removably retain the capture assembly (41, FIG. 13B) comprising a hollow diffuser (41a) and a cartridge holder (41b, FIG. 13C). The diffuser comprises plural ports (46) and is adapted to receive and removably retain the cartridge-holder (41b), which comprises plural sorbent-containing cartridges (48a, 48b) held in place by a retainer (47) comprising engagements (49a, 49b). When fully assembled and before deployment for use, the cartridges are sealed and isolated from the outer environment, thereby avoiding contamination of the sorbent in the cartridges. During use, the cover is removed, and the cartridges are exposed to the atmosphere. After use, the cover can be used to reseal the badge for storage. As needed, one or more of the cartridges are then removed from the dosimeter and subject to analytical testing for quantitation of captured VOC and SVOC. FIG. 13B depicts the capture assembly with the cover (43) removed such that the plural ports are visible, thereby exposing the cartridges (48a, 48b) to the atmosphere to permit capture of VOC and SVOC. FIG. 13C depicts the cartridge holder (41b) with disengaged from the diffuser (41a) and the cover (43).

FIG. 14 depicts an alternate embodiment (50) of the body/cartridge format device of the invention. The device comprises a cover (51) and a cartridge-holder (52) within which one or more sorbent-containing cartridges (53) are disposed. The cover is engageable with the cartridge-holder to provide a sealed environment and to isolate the cartridges from the atmosphere of an environment of use. The cartridge-holder comprises plural ports (54) to permit exposure of the cartridges while at the same time protection of the cartridges. This device has increased surface area and contains the sorbent in a cartridge embedded in a glass-microfiber filter paper. In an alternate embodiment, the cartridge is disengaged from the cartridge-holder and inserted into the cover for containment. The device is assembled by inserting the head (55) of the cartridge holder into a hole (56) at the base of the cover (51) and so that the head (55) exits the hole (57) at the head of the cover.

Figure 15A:
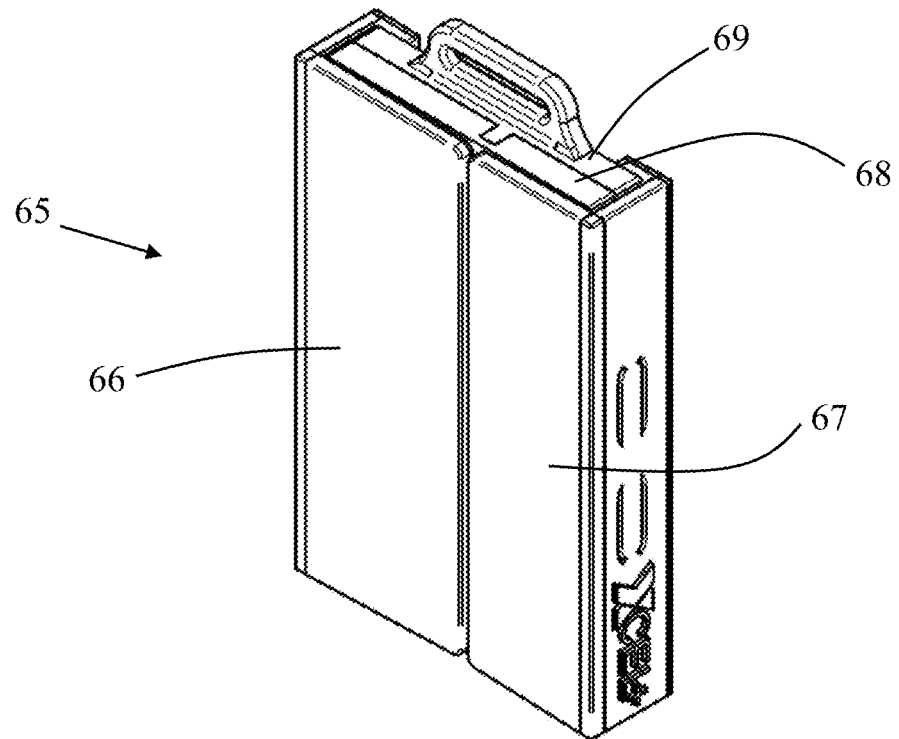
FIGS. 15A and 15B depict a perspective view of an alternative device of the invention assembled in two different arrangements.
Figure 15B:
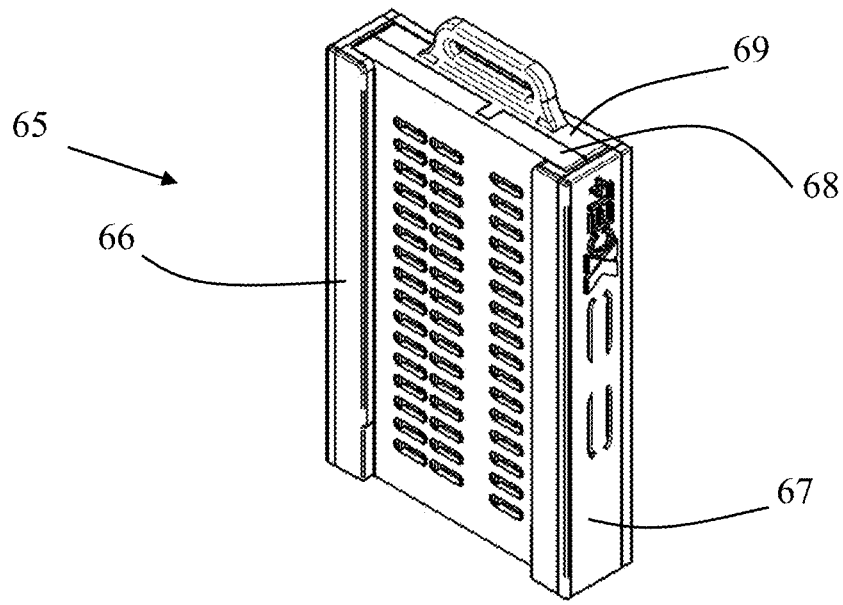
Figure 16:
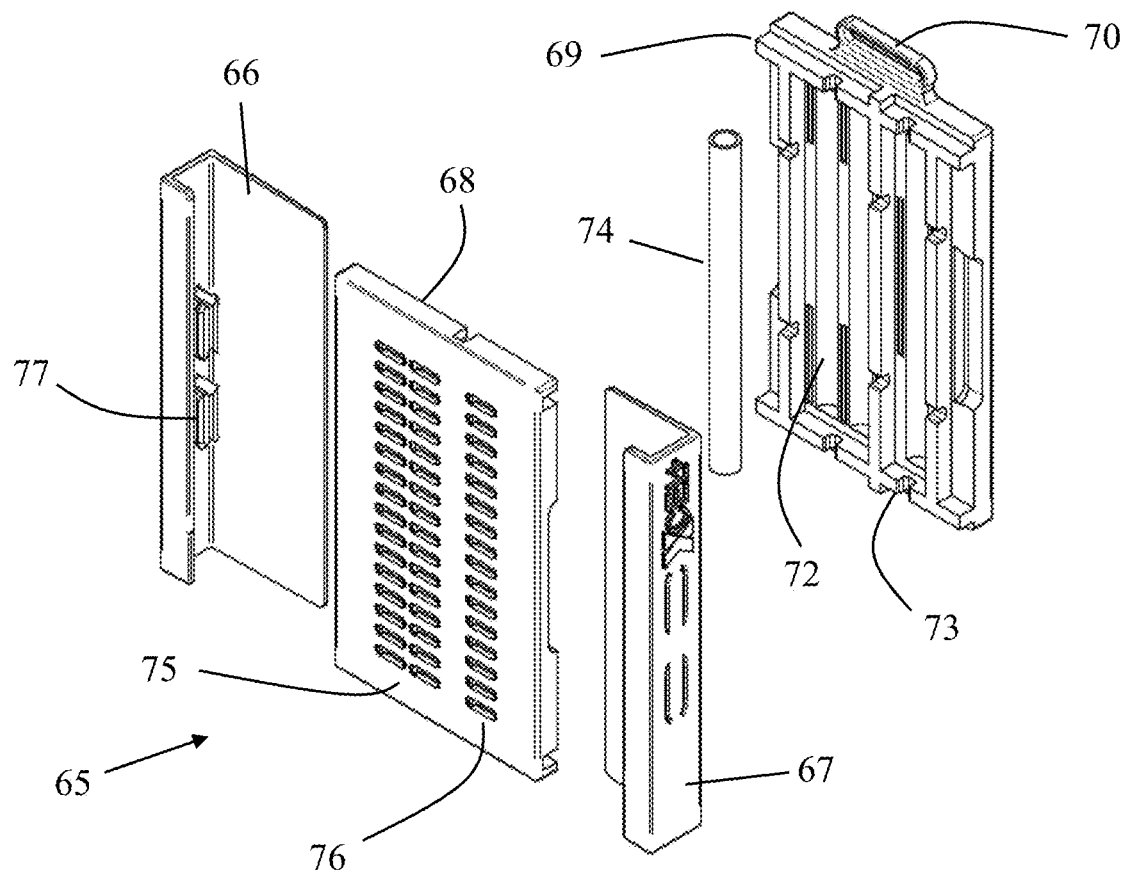
FIG. 16 depicts an exploded perspective view of the device of FIG. 15B.

FIGS. 15A and 15B depict alternate assembled arrangements of the device (65) comprising diffuser (68), cartridge holder (69), and covers (66, 67). In FIG. 15A, the covers superpose the ports of the diffuser, thereby sealing the interior of the device and avoiding exposure of the sorbent to the environment. In FIG. 15B, the covers superpose the rear of the device, thereby exposing the ports (75, 76 of FIG. 16) of the diffuser and the sorbent to the environment of use. FIG. 16 depicts an exploded view of the assembled device of FIG. 15B. The cover (66) comprises engagements (77) adapted to temporarily engage the cover with body of the diffuser (68) and/or the cartridge holder (69). The plural sorbent-containing cartridges (74) are placed in respective plural receptacles (72) of the holder (69) and held in place with plural respective retainers (73). In an alternate arrangement, the cover (66) superposes the ports (75), and the cover (67) does not superpose the ports (76), thereby allowing exposure of sorbent beneath the ports (76) but not of sorbent beneath the ports (75). In a likewise but opposite fashion of yet another an alternate arrangement, the cover (67) superposes the ports (76), and the cover (66) does not superpose the ports (75), thereby allowing exposure of sorbent beneath the ports (75) but not of sorbent beneath the ports (76).

As discussed above, a device comprising plural sections (portions) of sorbent that can be sealed independently of one another can be used to obtain, from a single device, samples having different exposure time limits.

Figure 17:
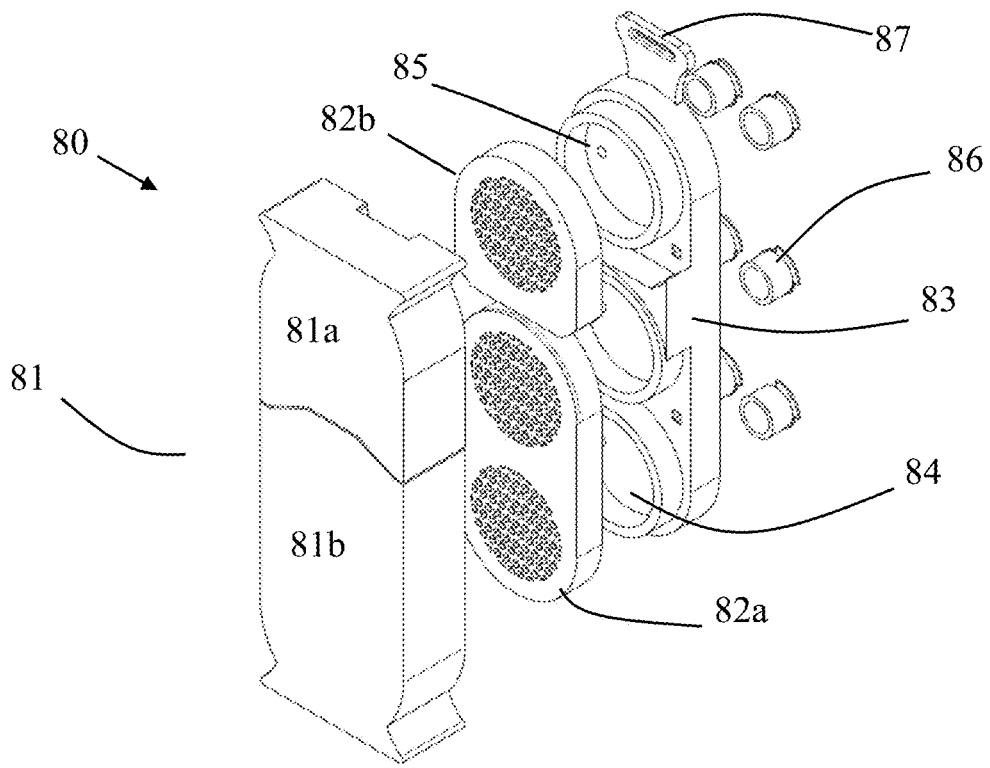
FIG. 17 depicts an exploded perspective view of an alternative device of the invention.

FIG. 17 depicts an exploded view of an alternate embodiment of a device (80) comprising a two-part cover (81), two-part diffuser (82a, 82b), and sorbent holder (83), which comprises plural chambers (receptacles, 84) that retain sorbent or substrate comprising sorbent. The chambers optionally comprise plural ports (85) that are optionally covered with respective port caps (86). The two-part diffuser (81) comprises an upper portion (82b) and a lower portion (82a) each of which superposes respective receptacles (84) of the holder. The cover (81) comprises an upper portion (81a) and a lower portion (81b). During storage, the portions (81a, 81b) of the cover superpose and seal respective portions (82b, 82a) and receptacles (84, 85). During use, one or more receptacles can be exposed to the environment of use as follows. The upper portion (81a) of the cover can be removed, thereby exposing the upper portion (82b) of the diffuser and its respective receptacle comprising sorbent therein. Alternatively, the lower portion (81b) of the cover can be removed, thereby exposing the lower portion (82a) of the diffuser and its respective receptacle comprising sorbent therein. Alternatively, both portions of the cover can be removed to expose all receptacles to the environment of use. During use, one of more of the port caps (86) can be removed from the ports (85) to increase diffusion of air through the device and maximize entrapment of VOC or SVOC.

In order to facilitate sorbent removal for analysis of VOC or SVOC entrapped therein, the diffuser portions (82a, 82b) can be removed separately. In this manner, some portions (sections) of sorbent can be analyzed while others are retained with the device for storage.

Figure 18:
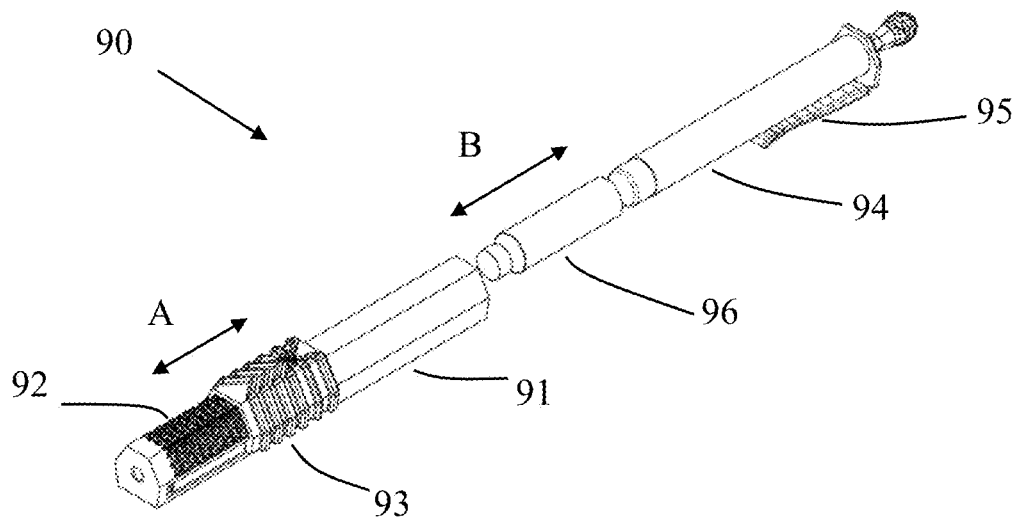
FIG. 18 depicts an exploded perspective view of an alternative device of the invention.
Figure 20A:
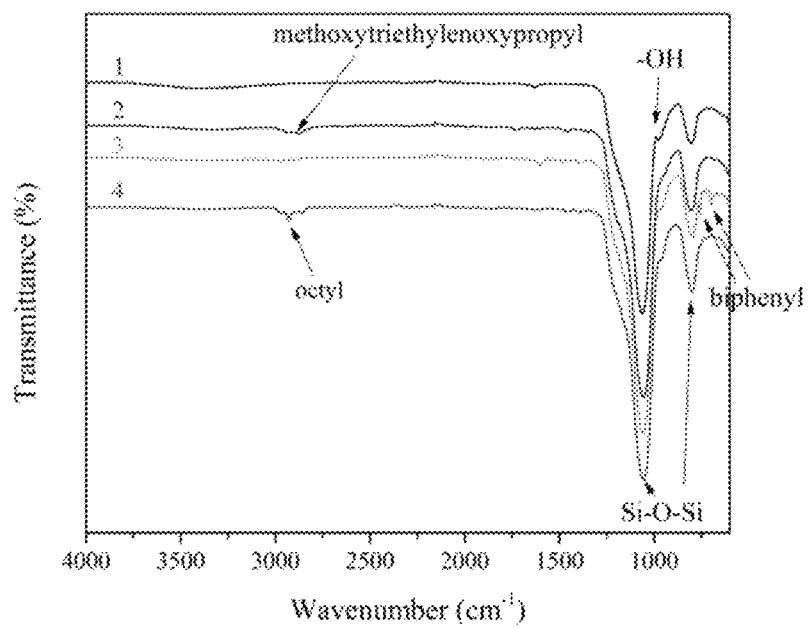
FIGS. 20A and 20B depict exemplary FTIR spectra for (1) pure OSU-6, (2) methoxytriethylenoxypropyl-functionalized OSU-6, (3) biphenyl-functionalized OSU-6, and (4) octyl-functionalized OSU-6 powders.
Figure 20B:
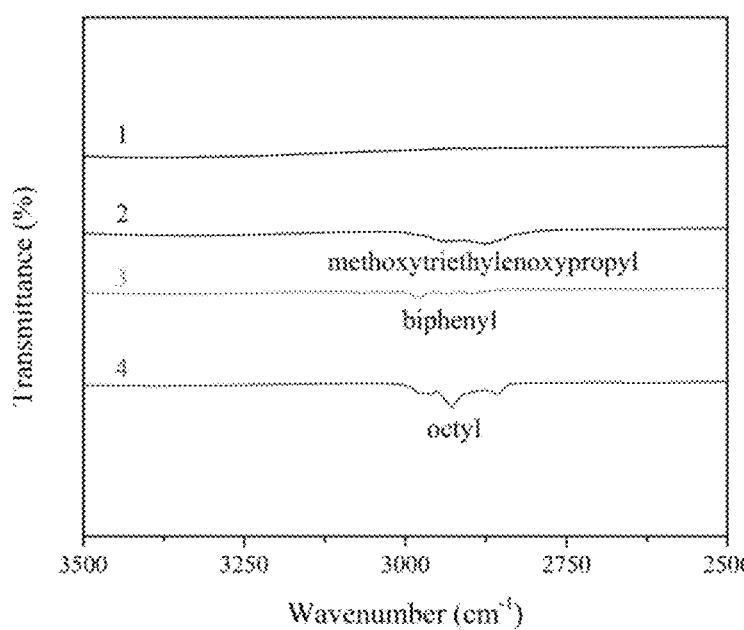

FIG. 18 depicts a pen-type device (90) comprising a cartridge-holder (94), sorbent-containing cartridge (96), diffuser body (91) and movable cover (93). After loading one or more cartridges onto the cartridge-holder, they are together inserted into the diffuser body in the direction of arrow B. The device optionally comprises a retainer, e.g. clip, for securing the device to a user during use. During storage, the cover (93) covers diffuser ports (92) and prevents exposure of the cartridge(s) to the open atmosphere. During use, the cover (93) is slid in the direction of arrow A, thereby exposing the diffuser ports and cartridge(s) to the environment of use. Removal of the cartridge is achieved by disengaging the cartridge-holder from the diffuser body in the reverse direction of arrow B.

FIG. 19 depicts an exploded view of another device (100) of the invention comprising a cap (105), sorbent-holder diffuser (103), and hollow-body cover (101). The sorbent-holder diffuser comprises a receptacle (104) for holding sorbent or sorbent-containing substrate, and it also comprises plural ports whereby the receptacle can be exposed to the exterior. The hollow-body cover receives and temporarily retains the diffuser by insertion thereof (along arrow C) into a receptacle (102) of the cover. The cap (105) is independently engageable with the diffuser and the hollow-body cover. For example, two-stage engagement can be employed, whereby the cap engages the cover with first-stage engagement and engages the diffuser with second-stage engagement.

Figure 22A:
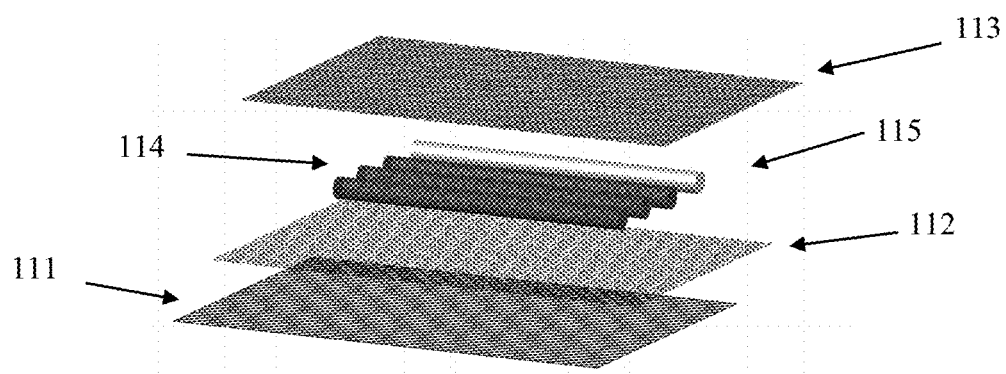
FIGS. 22A-22C depict a flexible device according to the invention.

FIG. 22A depicts a flexible device (110) comprising a front mesh layer (113), an intermediate fabric layer (112), an adhesive backing layer (111), plural porous sorbent-holding containers (114, tubes), and a non-porous sorbent-holding container (115, tube). The adhesive backing is adapted to adhere to a surface and can comprise adhesive compound(s), magnet(s), hook-and-loop fastener, snap(s), or other such means. The mesh material can comprise polypropylene, PTFE, wire-coated PTFE, or any other material known to be suitable for making a mesh. The sorbent-holding container can be a tube, pouch, rod, compressed pill, compressed tablet, or other such container.

Figure 22B:
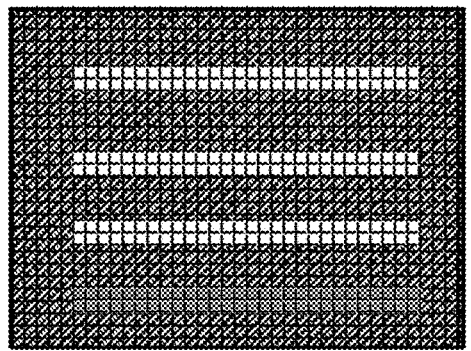
Figure 22C:
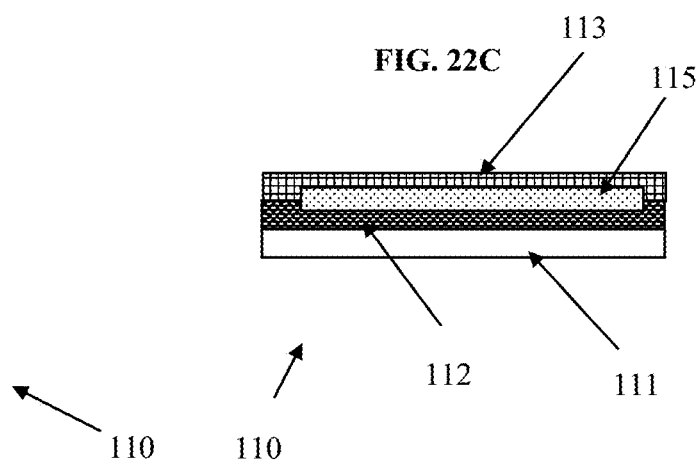

FIG. 22C depicts the disassembled device (110) showing the tubes (114, 115) disposed within the front mesh layer and the intermediate fabric layer. Although not depicted in the drawings, the device (110) may be enclosed within a removable non-porous packaging material.

Alternatively, the sorbent may be disposed within the front mesh and intermediate fabric but not enclosed within a sorbent-holding container.

Figure 23A:
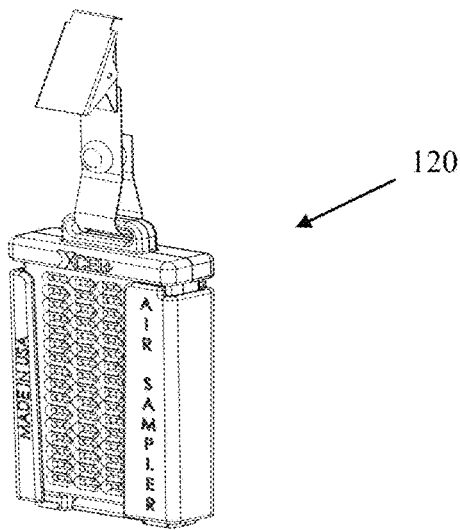
FIGS. 23A and 23B depict an alternate embodiment of the device of FIGS. 15A, 15B and 16.
Figure 23B:
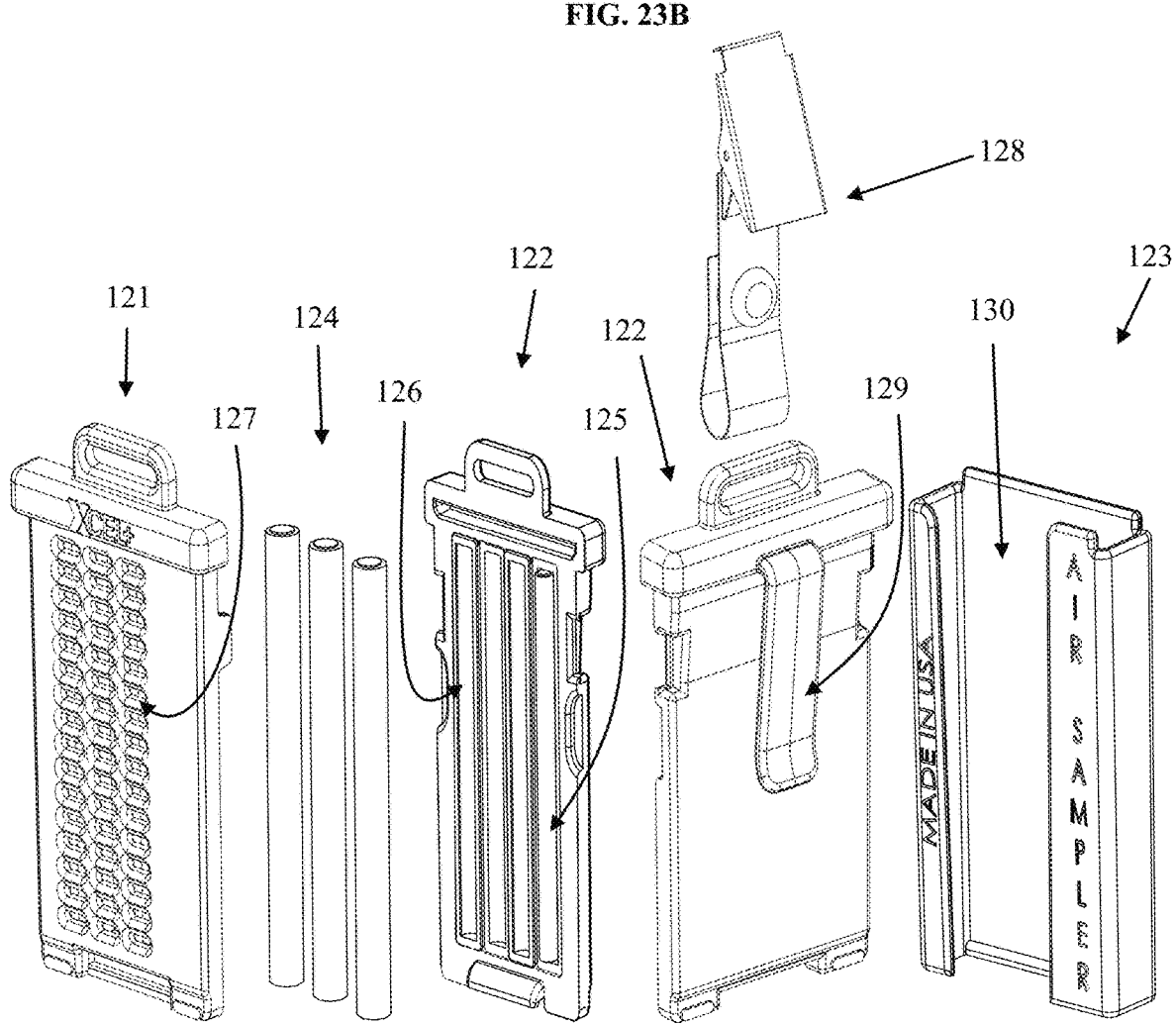

The device (120) of FIGS. 23A and 23B comprises a housing front panel (121) with plural perforations (127, pores, slits), a housing rear panel (122), and an optional casing (123), which can hold and temporarily retain the front and rear panels in its receptacle (130). The front and rear panels are separably joined to form an internal chamber (126) within which plural porous sorbent-containing tubes (124) and a non-porous sorbent-containing tube (125). The chamber can comprise one or more holders for said tubes. The casing (123) is removable from the housing and can be adapted to cover the perforations.

The housing can comprise mounting means for securing the device. An exemplary attachment means include a clip such as a lanyard clip (128) and/or a lapel/pocket clip (129); they may also include adhesive compound(s), magnet(s), hook-and-loop fastener, snap(s), or other such means.

Sorbent can be employed as loose powder, layer adhered to a substrate, sorbent containing cartridges, or other such forms (tablets, pellets, sachets). Suitable forms, such as a container, e.g. cartridge or tube, containing sorbent can be made by using a porous or gas-permeable material to retain the sorbent. The pores of the material would have to be smaller than the average particle size of the sorbent but large enough to permit diffusion of gas from the environment and into the sorbent.

A particularly useful material is porous PTFE (polytetrafluoroethylene; e.g. Teflon®) tubes for holding non-functionalized OSU-6 sorbent inside the housing of the injection molded dosimeters. Porous PTFE tubes and sheets including porous PTFE tube from Markel Corporation can be used. Some suitable tubes have a 3.5 mm OD (outer diameter), 3.0 mm ID, (inner diameter) and mean pore size of about 0.58 microns and maximum pore size of 1.98 microns. The sorbent cartridges provide ease of sorbent transfer into the cavities of (0.25"×3.5") of thermal desorber tubes (for recovery through thermal desorption) and/or 2 mL GC/MS vials for recovery through the solvent extraction analysis technique. The ends of the PTFE tube can be sealed with plugs or beads.

In order to provide a control sample of sorb ent, i.e. sample of sorbent that has not been exposed to VOC or SVOC, a device may further comprise a charge of sorbent within a non-porous sorbent-holding container. Accordingly, a device of the invention may comprise one or more porous sorbent-holding containers and one or more non-porous sorbent-holding containers.

Sorbent can be easily analyzed for entrapped VOC or SVOC by thermal desorption using thermogravimetry equipment. The sorbent or sorbent-containing substrate is simply placed in a sealed container and heated to a temperature above the desorption temperature of the target analyte (VOC or SVOC). An aliquot of the headspace of the container is then obtained and injected into a gas chromatograph. Alternatively, the sealed container is conductively engaged with the injection chamber of the gas chromatograph where, upon heating of the container and cartridge, a sample of the headspace of the container is obtained and analyzed. In some embodiments, the container is sealed with a septum.

In some embodiments, a device of the invention includes ports (vents) that are fully or partially opened or are adjustable as to extent of opening to optimize the sampling rate for the nature of the target analytes and the workplace. Workplaces with volatile organics may require small openings, while workers using relatively non-volatile materials or material in low concentration (i.e. regents, pesticides) will require larger openings to optimize the absorption and analysis.

The device of the invention can be used for, among other things: a) operational testing to monitor personal levels to chemicals in and around natural gas plants, oil refineries and fueling operations; b) operational testing to monitor personal exposure levels in and around multiple industrial operations to include construction (facilities management, air conditioning and refrigeration systems maintenance), health sciences (nursing and healthcare technicians), manufacturing (metal fabrication, machining, welding), and transportation and distribution logistics (automotive, diesel, pipeline etc.); c) operational testing on tarmac to measure person exposure level monitoring in and around airport operations; d) to monitor personal exposure levels in and around demolition site, site grading, soil stabilization site, and concrete or asphalt paving site; e) field-testing for exposure to pesticides; f) investigate the monitoring of target compounds such as polycyclic aromatic hydrocarbons (PAHs), volatile organic compounds, and toxic organic halogenated dioxins and furans from burn pits without contaminating the environment or exposing people to the toxins; or g) combinations of two or more thereof.

The ability to uptake and stabilize VOC and SVOC allows for prolonged storage conducive to maintaining a repository of samples for future analysis. The sorbent exhibits exceptional adsorption capacity, rate of capture and a high propensity to stabilize even compounds such as acetaldehyde and methylene chloride. After adsorption of VOC or SVOC, the sorbent can be introduced directly into the sample chamber of an analytical instrument, e.g. gas chromatograph and/or mass spectrometer, if desired, for rapid quantitation and/or identification of the adsorbed VOC or SVOC. In some embodiments, the sorbent retains an adsorbed VOC or SVOC even after exposure of a VOC-containing or SVOC-containing sorbent to a temperature of up to about 50° C. for a period of up to about 7 days.

Figure 7:
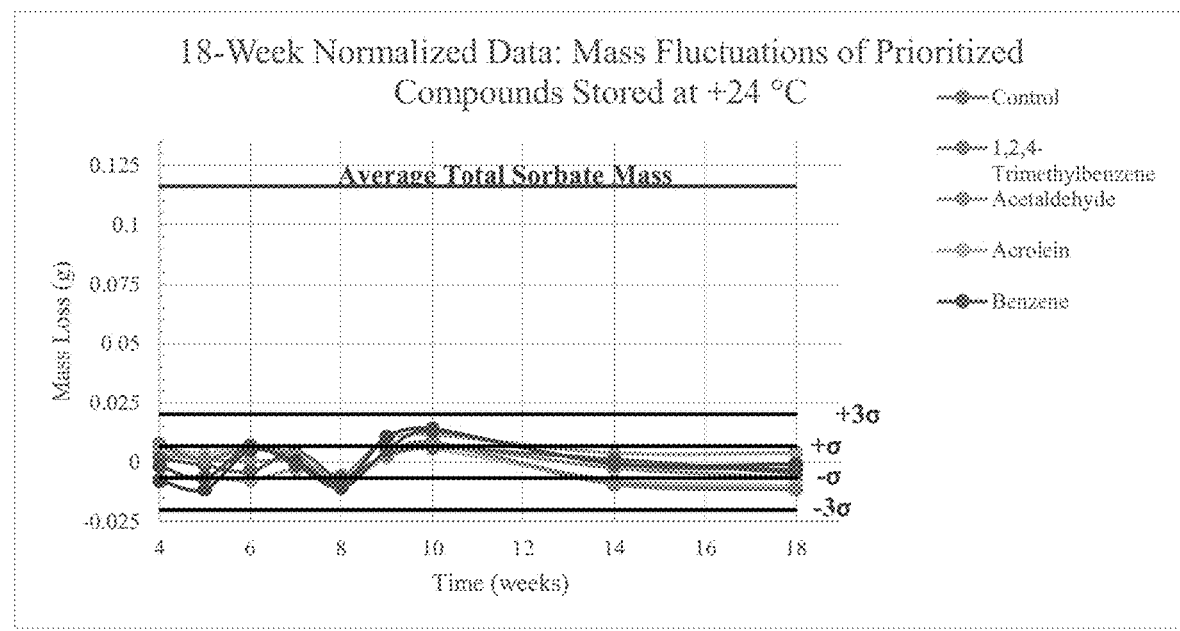
FIG. 7 depicts a chart summarizing the relative mass changes measured for sorbate (compound) loaded sorbent samples and non-functionalized OSU-6 sorbents after 18 weeks of storage at +24° C.

FIG. 7 depicts a chart summarizing the relative mass changes measured for sorbate (compound) loaded sorbent samples and non-functionalized OSU-6 sorbents after 14 weeks of storage at +24° C. Negative values indicate mass gains caused by the moisture adsorption on the sorbent surface. Majority of the exposed sorbent samples retained over 80% of the adsorbed sorbate (captured analyte) over 18 weeks. Little to no compound (sorbate) was lost from the sorbent upon extended storage at room temperature (about 24° C.) and ambient pressure over a period of 14 weeks, when the data was normalized for variation due to moisture sorption/desorption.

Once the badge is closed, the sorbent exhibits a high retention of the VOC and SVOC sorbate after capture thereof, meaning that little to none of the VOC or SVOC sorbate is desorbed from the sorbent during storage at room temperature. In some embodiments, the sorbate loses less than about 25%, less than about 20%, less than about 15%, less than about 10%, less than about 5%, less than about 2.5%, or less than about 1% of its initial mass during storage.

The sorbent stabilizes the VOC and SVOC sorbate against chemical degradation during storage. In some embodiments, the sorbate undergoes less than 5% or its initial mass due to chemical degradation during storage at room temperature (+24° C.) or in the refrigerator (+6° C.).

The sorbent and devices containing it can be stored under a variety of conditions and in a variety of different containers made of commercially available materials such as low-density polyethylene, polyvinylidene fluoride (PVDF), polypropylene, polyethylene terephthalate (PET), and nylon. Example 8 describes the use of sealed MYLAR (BoPET or biaxially-oriented PET) and PVDF bags, which were selected as suitable storage containers due to their low adsorption activity towards sorbed analyte (below 0.5 wt. %) and minimal losses of volatile targets (such as acetaldehyde and ethanol vapors) not exceeding several percent after a week of room-temperature storage. A preferred storage container is typically heat-sealed and may have a polymeric or metallic (e.g. aluminum) exterior coating to provide additional protection against light, moisture or static.

When used as a training aid, the VOC-containing or SVOC-containing sorbent releases the compound at a rate that is sufficiently slow to ensure release of the compound over an extended period of time of at least 8 h and sufficiently fast to ensure the VOC or SVOC can be detected by the animal being trained.

The VOC or SVOC adsorbed onto the sorbent of the training device can be an explosive. In some embodiments, the training aid is used to: a) imprint explosive detection canines on explosive odors; b) train explosive detection canines to detect explosive odors; c) evaluate explosive detection canines in accurately detecting explosive vapors; and/or d) evaluate explosive detection canines trained on live explosive odors.

The training aid can also be used as a reference explosive vapor source to calibrate explosive detection sensors and devices, test detection limits of explosive detection sensors and devices, test the accuracy of explosive detection sensors and devices, and/or evaluate the effectiveness in detection of explosive vapors by explosive detection sensors and devices An explosive-containing sorbent was prepared as described in Example 6. The loaded sorbent was then evaluated according to Example 12 to determine whether explosive adsorbed on the sorbent remains detonable or is converted to a non-detonable form.

By way of the impact test, it was determined that HMTD-containing sorbent with loading of HMTD of less than 50% by weight, based upon the total weight of sorbent and sorbate does not detonate under impact. No detonation was observed at impacts greater than that required for detonation of PETN. In addition, the loaded sorbent does not detonate even in an uncontrolled hammer test.

By way of the friction test, it was determined that friction could not detonate HMTD-containing mesoporous silica with HMTD loadings less than 50% by weight, based upon the total weight of sorbent and sorbate, indicating friction sensitivity significantly less than that of PETN.

Figure 21:
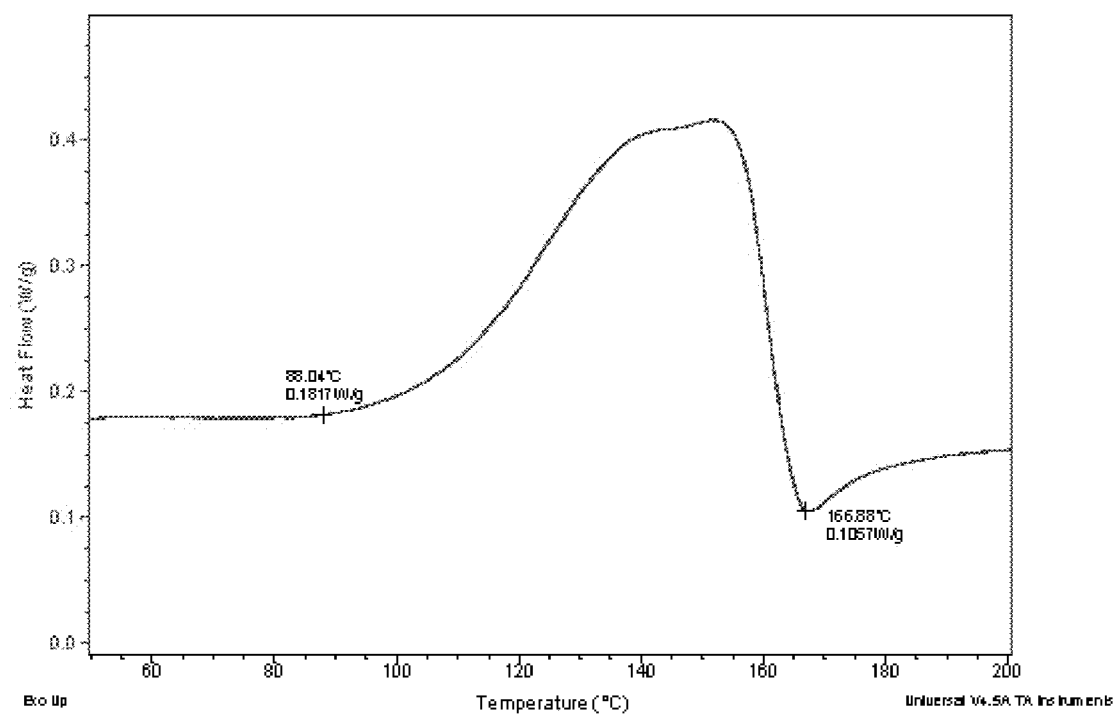
FIG. 21 depicts a DSC thermograph for an explosive-containing mesoporous silica sorbent of the invention, e.g. OSU-6 mesoporous silica loaded with 20% HMTD by weight with a total sample weight of 1.77 mg.

DCS can be used to classify materials as self-heating, explosive or detonable. HMTD-containing mesoporous silica exhibited a broad exothermic peak (FIG. 21) typical of a non-explosive material. The exothermic peak tended to extend from 85° C. to 170° C. with a slight endothermic step at the higher temperature side, presumably due to evaporation of decomposition products. This type of peak is in contrast to a sharp spike indicative of explosive decomposition. By way of the heat test, it was determined that heat could not detonate HMTD-containing mesoporous silica loaded with up to 25% by mass of the explosive.

By way of the flame test, it was determined that an open flame could not detonate HMTD-containing mesoporous silica.

Accordingly, the provides a non-detonable explosive-containing highly porous sorbent, which is non-detonable by fire, heat, friction or impact.

Even though the explosive-containing sorbent is non-detonable, regulatory agencies still require proper disposal of explosive-containing materials. The explosive-containing sorbent can be neutralized, meaning the explosive therein can be degraded, by exposing the explosive-containing sorbent to one or more neutralizing agents.

Example 13 describes an exemplary procedure for neutralizing the explosive-containing sorbent. One or more neutralizing agents are mixed with the explosive-containing sorbent in an aqueous solution. The explosive-containing sorbent is exposed to the one or more neutralizing agents for a period of at least 24-48 hours until all the explosive material has been degraded. After complete neutralization, the mixture of one or more neutralizing agents, fluid and sorbent is disposed.

One or more types of neutralizing agents can be selected from the group consisting of acid, surfactant (solubilizer), oxidizing agent, reducing agent, antioxidant, salt, and combinations of at least two, at least three, at least four or at least five of such types.

The acid can be inorganic acid, organic acid or a combination thereof. Inorganic acids include hydrochloric, hydrobromic, sulfuric, sulfonic, sulfamic, phosphoric, nitric, others known to those of ordinary skill in the art, and combinations thereof. Organic acids include amino acids, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic acid, others known to those of ordinary skill in the art, and combinations thereof.

As used herein, a "surfactant" refers to a compound that comprises polar or charged hydrophilic moieties as well as non-polar hydrophobic (lipophilic) moieties; i.e., a surfactant is amphiphilic. The term surfactant may refer to one or a mixture of compounds. A surfactant can be a solubilizing agent, an emulsifying agent or a dispersing agent. A surfactant can be hydrophilic or hydrophobic. Such surfactants can be anionic, cationic, zwitterionic or non-ionic. Suitable surfactants include sodium lauryl sulfate, polysorbate (PEGylated sorbitan, a derivative of sorbitol, esterified with fatty acid) or a combination thereof. Suitable polysorbates include polysorbate 20 (Polyoxyethylene (20) sorbitan monolaurate), polysorbate 40 (Polyoxyethylene (20) sorbitan monopalmitate), polysorbate 60 (Polyoxyethylene (20) sorbitan monostearate), polysorbate 80 (Polyoxyethylene (20) sorbitan monooleate), sodium lauryl sulfate (sodium dodecyl sulfate), poloxamer (comprising a central (poly (propylene oxide)) flanked by two chains of (poly(ethylene oxide), e.g. LUTROL), low molecular weight polyethylene glycol (e.g. PEG 400), or TRITON compound(s), such as TRITON-X. Examples of additional suitable solubilizer include: alcohols and polyols, such as ethanol, isopropanol, butanol, benzyl alcohol, ethylene glycol, propylene glycol, butanediols and isomers thereof, glycerol, pentaerythritol, sorbitol, mannitol, transcutol, dimethyl isosorbide, polyethylene glycol, polypropylene glycol, polyvinylalcohol, hydroxypropyl methylcellulose and other cellulose derivatives, cyclodextrins and cyclodextrin derivatives; ethers of polyethylene glycols having an average molecular weight of about 200 to about 6000, such as tetrahydrofurfuryl alcohol PEG ether (glycofurol, available commercially from BASF under the trade name Tetraglycol) or methoxy PEG (Union Carbide); amides, such as 2-pyrrolidone, 2-piperidone, caprolactam, N-alkylpyrrolidone, N-hydroxyalkylpyrrolidone, N-alkylpiperidone, N-alkylcaprolactam, dimethylacetamide, and polyvinypyrrolidone; esters, such as ethyl propionate, tributylcitrate, acetyl triethylcitrate, acetyl tributyl citrate, triethylcitrate, ethyl oleate, ethyl caprylate, ethyl butyrate, triacetin, propylene glycol monoacetate, propylene glycol diacetate, caprolactone and isomers thereof, valerolactone and isomers thereof; butyrolactone and isomers thereof; and other solubilizers known in the art, such as dimethyl acetamide, dimethyl isosorbide (Arlasolve DMI (ICI)), N-methyl pyrrolidones (Pharmasolve (ISP)), monooctanoin, diethylene glycol nonoethyl ether (available from Gattefosse under the trade name Transcutol), and water. Mixtures of solubilizers are also within the scope of the invention.

Antioxidants are classified based on their structure, occurrence and mode of action, solubility and kinetics. Suitable antioxidants include carotenoids (alloxanthin, (3-carotene, phytofluene, pectenoxanthin, lycopene, torulene, lutein, rhodopin, zeaxanthin, astacein), enzymes (superoxide dismutase, catalase, lactase, trypsin, maltase, amylase, glutathione peroxidase), glutathione, hormones (melatonin, estrogen), lipid associated chemicals (Ubiquinol-10, N-acetyl cysteine, lipoic acid), minerals (zinc, selenium, copper, tin chloride, magnesium chloride, calcium carbonate), phenolics (quercetin, catechins), saponines and steroids (Cortisone, Estradiol, Estriol), vitamins ($\alpha$-tocopherol, tocotrienols, ascorbic acid), or a combination thereof.

Oxidizing agents include water soluble and water insoluble oxidizing agent. Suitable oxidizing agents include potassium permanganate, hydrogen peroxide, inorganic peroxide, Fenton's reagent, ferric nitrate, nitric acid, formic acid, sulfuric acid, iodine pentoxide, iodobenzene dichloride, iodosobenzene diacetate, Jones reagent, Koser's reagent, peroxydisulfuric acid, peroxymonosulfuric acid, chlorites, chlorates, perchlorates, hypochlorites and other hypohylite compounds, chromic and dichromic acids, chromium trioxide, ferric chloride, nitrosobenzene, oxalyl chloride, peracetic acid, pivaldehyde, pyridinium chlorochromate, selenium dioxide, sodium perborate, sodium periodate, potassium nitrate, sodium bismuthate, ruthenium tetroxide, osmium tetroxide, or a combination of thereof.

Reducing agents include sulfur-containing or hydride containing agents. Suitable reducing agents include benzaldehyde, diphenylsilane, hydrazine, iron (II) sulfate, lithium aluminum hydride, formic acid, nickel borohydride, oxalic acid, phosphorous acid, potassium tetrahydroborate, Schwartz's reagent, sodium borohydride, sodium thiosulfate, sodium hydrosulfite, sodium hydroxymethanesulfinate, sodium triacetoxyborohydride, tributyltin hydride, tributylphosphine, triphenylphosphite, vasicine, zirconocene chloride hydride, or a combination of thereof.

Salts include sulfur-containing inorganic salts. Suitable salts include iron sulfide, zinc sulfide, potassium metabisulfite, calcium sulfate, magnesium sulfate, potassium sulfate, carbon disulfide, zinc sulfide, sodium thiosulfate, sodium hydrosulfite, sodium sulfate, potassium sulfite, magnesium hydrosulfite, or a combination of thereof.

In some embodiments, neutralization of the explosive is conducted in an aqueous mixture of surfactant, sulfur containing salt, oxidizing agent, reducing agent, and antioxidant. For example, when the explosive is peroxide-based (HMTD or TATP), a mixture at least of organic acid with surfactant is preferred. For the neutralization of TNT, RDX, and PETN explosives in the sorbent matrix, the sulfur-containing salt can be used.

The fluid in which neutralization is conducted is a non-explosive fluid and is typically aqueous. It can comprise water or a combination of water and one or more other components.

The exemplary embodiments herein should not be considered exhaustive, but merely illustrative of only a few of the many embodiments contemplated by the present invention.

Unless otherwise specified, values indicated herein should be understood as being limited by the term "about". As used herein, the term "about" is taken to mean a value that is within ±10%, ±5% or ±1% of the indicated value. For example, "about 6" is taken to mean 6±10%, 6±5% or 6±1%, respectively. As used herein, the term "major portion" is taken to mean "majority of", or if used in combination with "minor portion" is taken to mean "more than half". As used herein, the term "minor portion" is taken to mean "minority of", or if used in combination with "minor portion is taken to mean "less than half".

The entire disclosures of all documents cited herein are hereby incorporated by reference in their entirety.

EXAMPLES

The following materials and procedures are used to prepare exemplary embodiments of the invention and to demonstrate exemplary uses thereof.

Non-functionalized OSU-6 and the functionalized OSU-6 sorbents disclosed herein are products of XPLOSAFE, LLC (Stillwater, Okla.).

Example 1

Preparation of Improved Non-functionalized Mesoporous Silica MCM-41 type

The mesoporous silica of the invention was prepared according to a modified method of Apblett et al. ("Preparation of mesoporous silica with grafted chelating agents for uptake of metal ions" in *Chemical Engineering Journal* (2009), 155(3), 916-9240) or AlOthman et al. ("Synthesis and characterization of a hexagonal mesoporous silica with enhanced thermal and hydrothermal stabilities", in *Applied Surface Science* (2010), 256, 3573-3580), the entire disclosures of which are hereby incorporated by reference.

A templating solution was prepared first by dissolving 284.0 g (1.08 mol) of 1-hexadecylamine (HDA) in 1040 mL of distilled water at room temperature, sonicating for 5-10 min to produce foamy and uniform paste. A second solution was prepared by mixing 524 g (2.4 moles) of tetraethylorthosilicate, 448 mL (0.96 moles) of ethanol and 96 mL (1.6 moles) of isopropanol in under magnetic stirring at room temperature for about 45 min. The first solution was stirred for 40 min followed by the addition of 1000 mL of 1.0 M HCl solution in increments over 10-15 minutes and then the second solution in a three-necked round-bottom flask. After 5 min of stirring, 148 mL (1.2 moles) of auxiliary organic mesitylene was added to the reaction mixture, which was then stirred for an additional 25 min. After that, the stirring was stopped, and 1600 mL of distilled water was added to the mixture, which was swirled to mix and then left to age for 7 days at room temperature. The resulting solid was recovered by filtration, washed with distilled water and ethanol (three times) using a fine filter funnel.

Example 2

Preparation of Improved Functionalized Mesoporous Silica MCM-41 type

Briefly, 10 g of OSU-6 powder was refluxed in 100 mL of dry toluene for four hours in dry atmosphere followed by washing with dry toluene and drying at 80° C. under vacuum. The resulting material was mixed in 100 mL of dry toluene with 20 mL of trimethylamine (TEA) and stirred for around an hour at room temperature. The obtained solid was filtered off with a fine filter funnel, washed with 50 mL of dry toluene three times, and vacuum-dried. During the first functionalization step, 3.0 g (~50 mmol) of the TEA-reacted OSU-6 was refluxed with 50 mmol of a functionalizing agent in 100 mL of dry toluene for 48 hours under $N_2$ atmosphere. The resulting solid mixture was filtered off with a fine filter funnel and washed three times, first with 50 mL of toluene and then with ethanol to remove any remaining functionalizing agent. The obtained white solid was dried at 80° C. under vacuum for 24 hours. The described procedure was then repeated with 2 g of the functionalized OSU-6 to investigate the effect of the multi-step functionalization on the density of functional groups attached to the surface of the functionalized sorbent.

Example 3

Characterization of Properties of Mesoporous Silica

Pore Size and Pore Volume:

This is determined according to the procedure of Barrett-Joyner-Halenda (BJH) model ("The determination of pore volume and area distributions in porous substances. I. Computations from nitrogen isotherms" in J.A.C.S. (1951), 73, 373-380), the entire disclosure of which is hereby incorporated by reference. 20-point $N_2$ adsorption and desorption Brunauer-Emmett-Teller (BET) isotherms were recorded for each powder. Exemplary nitrogen isotherms for the non-functionalized (FIG. 2A) and methoxytriethylenoxypropyl-functionalized (MP-functionalized) mesoporous silica (FIG. 2B) were obtained.

FIG. 2A contains type IV isotherms, which are associated with the capillary condensation of adsorbate into mesopores, while the observed hysteresis of type A indicates that pores of the mesoporous silica have cylindrical shapes. After functionalization (FIG. 2B), the hysteresis disappears, and the adsorption-desorption isotherms assumed the shapes of type II isotherms due to the attachment of functional groups to the pore walls.

Figure 3:
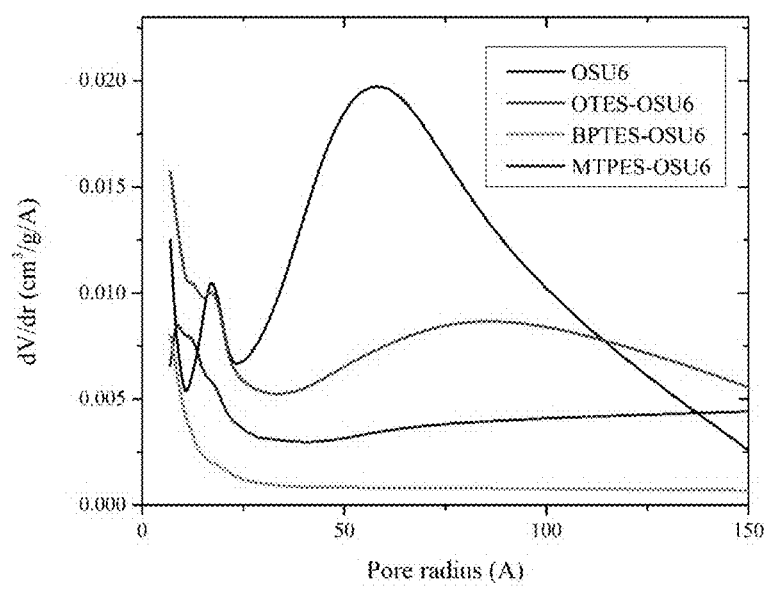
FIG. 3 depicts pore size (radius measured in Angstroms) distributions of the functionalized and non-functionalized sorbents analyzed using the BJH model.

The pore size distributions of the functionalized and non-functionalized sorbents analyzed using the BJH model are shown in FIG. 3. The plots of the differential volumes versus average pore radii indicate that the average pore diameter for non-functionalized mesoporous silica (corresponding to the maximum value of dV/dr) amounts to about 10 nm. However, this value is significantly reduced after functionalization to as low as 2 nm.

The surface area was also determined. The following table summarizes the observed approximate surface area for some of the different sorbents.

| Sorbent | BET Surface Area Measurement ($m^2/g$) | Density ($nm^{-2}$) | Decomposition Temperature/ ° C. |
|---|---|---|---|
| OSU-6 | 570 | N/A | |
| OT-OSU-6 | 390 | 1.5 | 215 |
| MP-OSU-6 | 290 | 1.2 | 250 |
| BP-OSU-6 | 420 | 1.4 | 145 |

A decrease in the BET surface area by a factor of about 3-4 or more (from 550 $m^2/g$ down to 170 $m^2/g$) was observed for functionalized mesoporous silica as compared to non-functionalized mesoporous silica. In all cases, the surface coverage of all functional groups (calculated from the results of thermogravimetric analysis and measured BET surface area) amounted to 1.1-1.3 groups/$nm^2$.

The measured BET surface area was reduced from the initial 570 $m^2/g$ for pure OSU-6 to 290-420 $m^2/g$ for the functionalized OSU-6 sorbents, which was consistent with the presence of various functional groups on the pore surface. In addition, the table also includes the functional group densities (per $nm^2$ of the OSU-6 pore surface) and the decomposition temperatures determined from the TGA spectra recorded at a heating rate of 5° C./min. According to the TGA results, the attached functional groups with densities of 1.2-1.5 nm' are stable at temperatures below 145-250° C. depending on the functionalizing agent. Thus, all functionalized sorbates have sufficiently high decomposition temperatures to allow their use in extreme environments.

Channel Wall Thickness:

This is determined from TEM images using the procedure reported by A. AlOthman and Allen W. Apblett ("Synthesis and characterization of a hexagonal mesoporous silica with enhanced thermal and hydrothermal stabilities", in *Applied Surface Science* (2010), 256, 3573-3580), the entire disclosure of which is hereby incorporated by reference. In brief, wall thickness is measured using the microscope and by visual comparison of image details to the image scale.

Confirmation of Functionalization:

Confirmation of functionalization of the mesoporous silica was obtained by Fourier transform infrared spectroscopy (FTIR).

The FTIR spectrum for the OSU-6 sorbent was characterized by two main features at 796 and 1052 $cm^{-1}$ (corresponding to the Si—O—Si silica vibrations) and a small peak at 974 $cm^{-1}$ resulting from the —OH hydroxyl groups attached to the pore surface. A broad adsorption band was observed at around 3400 $cm^{-1}$ due to the —OH stretching vibrations of physisorbed water species. In the octyl- and methoxytriethylenoxypropyl-functionalized OSU-6, a band representing the C—H stretching vibrations of the attached alkyl groups was clearly observed at around 2900 $cm^{-1}$, while the peaks at 695 $cm^{-1}$ and 758 $cm^{-1}$ detected for the biphenyl-functionalized OSU-6 were due to the $sp^2$ C—H bending of the attached biphenyl groups.

FIGS. 22A and 22B depict exemplary FTIR spectra for (1) pure OSU-6, (2) methoxytriethylenoxypropyl-functionalized OSU-6, (3) biphenyl-functionalized OSU-6, and (4) octyl-functionalized OSU-6 powders.

Example 4

Preparation of Sorbent Comprising a Mixture of Non-Functionalized Mesoporous Silica and Functionalized Mesoporous Silica Method A:

A known amount of non-functionalized mesoporous silica is mixed with a known amount of functionalized mesoporous silica to provide a mesoporous silica mixture.

The weight ratio of non-functionalized mesoporous silica to functionalized mesoporous silica can range from about 1:100 to about 100:1 with all integer and fractional values therein or therebetween being contemplated.

Method B:

Sorbents comprising physical mixtures of one, two or three mesoporous silicas were prepared according to the following table, which indicates the weight percent of each.

| Composition | OSU-6 (% wt) | MP-OSU-6 (% wt) | BP-OSU-6 (% wt) |
|---|---|---|---|
| 1 | 100 | 0 | 0 |
| 2 | 90 | 10 | 0 |
| 3 | 80 | 20 | 0 |
| 4 | 70 | 30 | 0 |
| 5 | 90 | 0 | 10 |
| 6 | 80 | 0 | 20 |
| 7 | 70 | 0 | 30 |
| 8 | 80 | 10 | 10 |
| 9 | 70 | 20 | 10 |
| 10 | 60 | 30 | 10 |
| 11 | 70 | 10 | 20 |
| 12 | 70 | 10 | 30 |
| 13 | 60 | 20 | 20 |
| 14 | 50 | 20 | 30 |
| 15 | 50 | 30 | 20 |
| 16 | 40 | 30 | 30 |

The mixtures were prepared by mixing measured amounts of each component and mixing the components together to form the target composition under ambient conditions.

Example 5

Preparation of Various Forms of Mesoporous Silica

Sorbent Pellets:

Pure sorbent powder was also pressed into 6-mm and 12-mm circular pellets using a die. The 12-mm pellets were produced by utilizing a manual pellet press (CARVER 4350.L) under an applied force of 2 tons and exposure time of 90 seconds, while the 6-mm pellets were manufactured by an automated pellet press (TDP-7) under 4 tons of applied force (FIG. 6). No reduction in surface area at this relatively low pressure was detected. Even after pressing the sorbent powder into a pellet, the measured surface area per gram was not substantially reduced until the pressure reached 8 tons, at which a reduction in surface area of around 20-25% was observed. To ensure the durability of the pressed 6-mm pellets, 20 wt. % of cellulose was added to the pure sorbent powder before pressing. All pellets were annealed in an oven at 600° C. for 24 hours prior to sorption experiments to remove any traces of organic impurities and the cellulose binder.

Sorbent Thin Film:

A thin film of sorbent was produced using a drop casting technique according to the method of Zhu et al. ("High-performance humidity sensors based on quartz crystal micro-balance coated with mesoporous silica MCM-41 thin film" in Materials Technology (2017), 32, 101-104, the entire disclosure of which is hereby incorporated by reference).

Sorbent powder containing 50 wt. % of OSU-6, 30 wt. % of BP-OSU-6, and 20 wt. % of BP-OSU-6 was suspended in solvent, e.g. alcohol such as ethanol. About 100-200 microgram of sorbent powder was deposited as a thin film onto a glass/quartz/polymer surface. Briefly, a suspension of sorbent powder in ethanol with a concentration of 2 mg/mL was prepared by ultrasonication and then deposited on a substrate surface using a pipette. The obtained film was dried in air followed by annealing at 85° C. for 5-10 min inside a furnace to completely remove any trace of ethanol thereby leaving the thin film of sorbent adhered onto the substrate.

Example 6

Capture/Uptake/Adsorption and Recovery of VOC or SVOC with Mesoporous Silica

Capture/Uptake

A known amount of mesoporous silica is exposed to a gaseous atmosphere (at ambient temperature (about 22-25° C.) and ambient pressure (about 1013 mbar) containing the target VOC or SVOC.

More specifically, the 6 mm diameter sorbent pellets and the target VOC or SVOC were placed in a closed chamber under ambient conditions. The interior atmosphere of the chamber was equilibrated under ambient conditions for a period of 15 min or at least 8 hours, whereby volatized compound adsorbed onto the sorbent. Uptake of contaminant vapors inside the sorbent pores was evaluated by measuring the weight gain or uptake of the target compound material after fixed time intervals. The adsorption process was considered complete when the sorbent mass stopped increasing with time.

The table below indicates the approximate ("about") uptake capacity and rate of capture for OSU-6 exposed to the listed compounds. The rate of capture was obtained by fitting the capture over time data with an exponential function equation corresponding to first-order adsorption kinetics. FIGS. 4A and 4B depict additional adsorption/desorption data.

| Class | Target compound | Uptake capacity (g/g sorbent) |
|---|---|---|
| Polynuclear Hydrocarbons (PAHs) | Naphthalene | 0.221 ± 0.006* |
| Alcohol | Ethanol | 1.69 ± 0.01 |
| Anesthetic (solvent) | Diethyl ether | 0.762 ± 0.005 |
| Disinfectant | Chloroxylenol | 0.46 |
| Organic acid | Acetic acid | 2.33 |
| Reactive monomer | Methylmethacrylate | 2.29 |
| Carbonyl Compounds | Acetaldehyde | 3.9 ± 0.2 |
| | Acetone | 1.329 ± 0.005 |
| | Vinyl acetate | 1.34 ± 0.02 |
| | Acrolein | 1.16 ± 0.05 |
| Fuels | Hexane | 0.94 ± 0.01 |
| | Octane | 0.98 ± 0.05* |
| | Xylene | 1.216 ± 0.008 |
| | Benzene | 1.268 ± 0.006 |
| | 1,2,4-Trimethylbenzene | 1.239 ± 0.007 |
| Chlorinated solvents | Methylene chloride | 2.11 ± 0.05 |
| | Trichloroethylene | 2.10 ± 0.01 |
| Organophosphates | Dichlorvos | 0.286 ± 0.009* |
| | Malathion | 0.47 |
| Nitramines | RDX | 0.21 ± 0.03* |
| Pyrethroids | Permethrin | 0.112 ± 0.007* |
| Nitroaromatics | TNT | 0.109 ± 0.006 |
| Tetrazoles | 1,2,3,4-tetrazole | 0.127 ± 0.008* |
| | 5-aminotetrazole | 0.021 ± 0.003* |
| Chlorocarbons Organochlorines PCBs/PCDFs/PCDDs | PCB 209 | 0.074 ± 0.005* |

*Measured for 6-mm sorbent pellets.

For samples not marked with an asterisk, the sorbent was in powder form.

Additional evaluations were made to compare side-by-side the uptake of VOC and SVOC by three different forms of OSU-6. The table below summarizes the results observed.

| Target compound and its room temperature vapor pressure | Sorbent (OSU-6) | Adsorption Capacity (g/g sorbent) | Saturation time (h) |
|---|---|---|---|
| Acetaldehyde (101 kPa) | Powder | 3.9 ± 0.2 | 12 |
| | 12-mm pellet | 0.33 ± 0.01 | 2 |
| | 6-mm pellet | 1.29 ± 0.03 | 6 |

-continued

| Target compound and its room temperature vapor pressure | Sorbent (OSU-6) | Adsorption Capacity (g/g sorbent) | Saturation time (h) |
|---|---|---|---|
| Methylene chloride (53 kPa) | Powder | 2.11 ± 0.05 | 19 |
| | 12-mm pellet | 0.50 ± 0.01 | 2 |
| | 6-mm pellet | 1.69 ± 0.04 | 15 |
| Acrolein (37 kPa) | Powder | 1.16 ± 0.05 | 24 |
| | 12-mm pellet | 0.37 ± 0.01 | 5 |
| | 6-mm pellet | 0.77 ± 0.03 | 8 |
| Hexane (19 kPa) | Powder | 0.94 ± 0.01 | 43 |
| | 12-mm pellet | 0.260 ± 0.006 | 10 |
| | 6-mm pellet | 0.61 ± 0.03 | 25 |
| Vinyl acetate (11 kPa) | Powder | 1.34 ± 0.02 | 80 |
| | 12-mm pellet | 0.396 ± 0.007 | 3 |
| | 6-mm pellet | 1.08 ± 0.04 | 10 |
| Benzene (10 kPa) | Powder | 1.268 ± 0.006 | 70 |
| | 12-mm pellet | 0.327 ± 0.003 | 10 |
| | 6-mm pellet | 1.06 ± 0.05 | 30 |
| Xylene (1.1 kPa) | Powder1 | 1.216 ± 0.008 | 750 |
| | 12-mm pellet | 0.334 ± 0.009 | 15 |
| | 6-mm pellet | 0.85 ± 0.08 | 10 |
| 1,2,4-trimethylbenzene (0.28 kPa) | Powder | 1.239 ± 0.007 | 2000 |
| | 12-mm pellet | 0.394 ± 0.007 | 100 |
| | 6-mm pellet | 1.2 ± 0.1 | 100 |
| Naphthalene (0.013 kPa) | Powder | | |
| | 12-mm pellet | 0.274 ± 0.005 | 4000 |
| | 6-mm pellet | 0.221 ± 0.006 | 900 |

The capacity typically increased for the three different forms of sorbent in the following order: 12-mm pellet<6 mm pellet<powder, meaning the powdered sorbent typically exhibited the highest capacity due to its higher surface area. The saturation time typically increased for the three different forms of sorbent in the following order: 12-mm pellet<6 mm pellet<powder, meaning the powdered sorbent typically exhibited the highest saturation time.

Recovery by Solvent Extraction

In some embodiments, recovery was conducted by solvent extraction. The compound-loaded sorbent was treated with solvent known to be able to dissolve the target VOC or SVOC. A sample of the compound-containing solvent was then analyzed by GC/MS (gas chromatograph equipped with mass spectrometer detector). In order to develop calibration curves, control samples of sorbent (25 mg) containing known amounts of target compound were prepared by placing known amounts of sorbent on a microbalance and spiking the sorbent with known amounts of target compound. Sorbent was then extracted with a predetermined amount of solvent (2.0 g) and aliquots of the compound-containing solvent were analyzed by GC/MS.

Extraction was performed with 2 mL of acetonitrile, and analyses were run with the GC/MS in the SIM mode using the known molecular weights of the target compounds. The detection limits and quantitation limits were calculated from the average number of counts and the standard deviation of nine blank samples. Using these protocols, the amounts of the analytes sorbed in OSU-6 when exposed at their PEL limits for 15 minutes and 8 hours were determined.

| Class | Target compound | Recovery efficiency (%) | Detection limit (ng) | Quantitation limit (ng) |
|---|---|---|---|---|
| Polynuclear hydrocarbons | Naphthalene | 92.9 | 5920 | 7220 |
| Carbonyl compounds | Acetaldehyde | | | |
| | Acrolein | | | |
| | Vinyl acetate | 100 | 162 | 212 |

-continued

| Class | Target compound | Recovery efficiency (%) | Detection limit (ng) | Quantitation limit (ng) |
|---|---|---|---|---|
| Fuels | Benzene | 97.0 | 16.4 | 20.9 |
| | n-Hexane | 100 | 55.8 | 92.8 |
| | n-Octane | 96.2 | 55.9 | 71.1 |
| | 1,2,4-Trimethyl-benzene | 92.3 | 10.3 | 18.0 |
| | o-Xylene | 94.9 | 19.6 | 26.2 |
| Chlorinated solvents | Methylene chloride | 99.7 | 145.1 | 375.2 |
| | Trichloro-ethylene | 91.1 | 22.1 | 29.4 |
| Organophosphates | Dichlorvos | 96.6 | | |
| Nitramines | RDX | | 3830 | 4130 |
| Pyrethroids | Permethrin | | | |
| Nitroaromatics | TNT | 82.5 | 18.9 | 30.8 |
| Tetrazoles | 1,2,3,4-tetrazole 5-aminotetrazole | 84.5 | 1240 | 2050 |
| Chlorocarbons organochlorines | PCB 209 | | | |

Example 7

Determination of Thermal Stability of Adsorbed Compound(s)

The stability and desorption kinetics of the captured compounds from the surface of non-functionalized and functionalized sorbent powders was determined by thermal desorption and thermogravimetric analysis (TGA).

Glass vials containing compound-loaded sorbent powders, 12-mm pellets or 6-mm pellets were provided. The sorbate content in the sorbent pores, i.e. the weight of the sorbent powder, was monitored as a function of temperature in the range from about 25-200° C. (which was ramped at a rate of 5° C./min in a thermogravimetric analyzer). The table below lists the maximum desorption temperatures obtained from the TGA experiments for some of the tested compounds adsorbed on the surfaces of non-functionalized and functionalized OSU-6 sorbent powders with initial contents of VOC or SVOC between 15 and 40 wt. %.

| | OSU-6 (° C.) | OT-OSU-6 (° C.) | BP-OSU-6 (° C.) | MP-OSU-6 (° C.) |
|---|---|---|---|---|
| Hexane | 50 | 44 | 45 | 43 |
| Benzene | 63 | 41 | 45 | 46 |
| Xylene | 110 | 86 | 80 | 95 |
| Acetaldehyde | 52 | 43 | 42 | 45 |
| Vinyl acetate | 53 | 45 | 51 | 54 |
| 1,2,4-trimethylbenzene | 130 | 100 | 105 | 110 |
| Acrolein | 50 | 48 | 46 | 52 |
| Naphthalene | 140 | 110 | 145 | 120 |

An exemplary thermograph for desorption of benzene from the above different sorbents is depicted in FIG. 5.

Example 8

Determination of Storage Stability

The storage stability of the compound-loaded sorbent toward desorption upon long-term storage was determined.

VOC-loaded or SVOC-loaded sorbent was placed inside an evaluated and chosen zip-locked Poly Mylar bag with a tear notch and its stability monitored at different temperatures. In addition, short-term storage studies were completed for a subset of the compounds (acetaldehyde, acrolein, benzene, and vinyl acetate) in zip-locked Poly Mylar bags at +24° C., which were subsequently analyzed by both mass spectrometry and by measuring the mass change after 1, 3, 6, 9, and 14 days. This data developed a case for using PVDF (polyvinylidene fluoride) bag having a wall thickness of at least 3 mil as a viable and practical container for the sorbent/dosimeter transfer to and from the field. Those bags exhibit high stability, high melting point, low sorption capacity and chemical inertness. As a control and to quantify the moisture effect on the stored bags, unexposed OSU-6, activated carbon, and Tenax samples were prepared for each storage batch.

The mass changes measured with respect to the sum of the sorbent and sorbate masses were determined. Negative values denoted mass losses, while positive values denote the mass gain potentially due to moisture adsorption. As a control and to quantify the moisture effect on the stored bags, blank OSU-6, activated carbon, and Tenax samples (without a contaminant) were prepared for each storage batch.

Two "industry-standard" sorbent media (activate charcoal and Tenax TA 6-80) served as control groups for long-term storage studies. Selection of the specific grade of activated charcoal was based on the information presented in the OSHA Technical Manual (Section II: Chapter 1, *Personal Sampling for Air Contaminants*). The standards listed in that document were derived from the OSHA research efforts conducted at the Salt Lake City Technical Center (SLTC) and the Cincinnati Technical Center (CTC), which were subsequently validated by both OSHA and NIOSH for air monitoring applications. "Charcoal Tubes" containing 100 mg of 20 mesh activated charcoal and 50 mg of 40 mesh activated charcoal were used the sorbent media utilized for OSHA-approved monitoring techniques. Tenax TA 60-80 mesh was selected as the polymer-based sorbent media standard.

Storage samples for the sorbent of the invention analyzed after 60 days of storage at room temperature did not exhibit any decomposition or contamination products.

Data available indicated very long storage stability (over 3 years) for methylene chloride adsorbed onto the mesoporous silica of the invention when the methylene chloride-loaded sorbent samples were stored in a freezer. The samples retained the original mass spectrometry methylene chloride (m/z=49) intensity and showed no contamination or decomposition products. The obtained data provides preliminary feasibility towards the possibility of establishing an Exposure Monitor Repository where the dosimeter sorbent media can be stored for substantially longer periods (months to years) and retroactively analyzed as new methodology or new prioritized target compounds emerge.

Storage stability in terms of desorption of the VOC or SVOC from the sorbent was evaluated under the same conditions set forth above. OSU-6 with no compound adsorbed thereon was used as a control in order to account for the change in weight due to moisture sorption/desorption during the study period. The weight of the sorbent was measured on a weekly basis. The data (FIG. 7) indicate little to no compound (sorbate) was lost from the sorbent upon extended storage at room temperature (about 24° C.) and ambient pressure over a period of 14 weeks, when the data was normalized for variation due to moisture sorption/desorption.

Example 9

Comparison of Non-Functionalized and Functionalized Mesoporous Silica

The procedure of Example 6 was followed with the exception that either non-functionalized mesoporous silica or functionalized mesoporous silica was used. The following table summarizes the uptake capacities (g/g sorbent) for selected target analytes on OSU-6 and functionalized OSU-6 sorbents.

|  | OSU-6 | OT-OSU-6 | BP-OSU-6 | MP-OSU-6 |
| --- | --- | --- | --- | --- |
| Methylene chloride | 2.28 ± 0.08 | 1.86 ± 0.04 | 1.83 ± 0.05 | 1.69 ± 0.05 |
| Hexane | 1.14 ± 0.01 | 0.91 ± 0.02 | 0.90 ± 0.03 | 0.83 ± 0.02 |
| Benzene | 1.49 ± 0.03 | 1.20 ± 0.02 | 1.17 ± 0.02 | 1.09 ± 0.02 |
| Acetaldehyde | 2.2 ± 0.1 | 1.14 ± 0.02 | 1.21 ± 0.05 | 1.38 ± 0.09 |
| Vinyl acetate | 1.58 ± 0.04 | 1.24 ± 0.02 | 1.24 ± 0.02 | 1.15 ± 0.03 |
| Trichloroethylene | 2.53 ± 0.03 | 2.03 ± 0.05 | 1.98 ± 0.03 | 1.79 ± 0.04 |
| Acrolein | 1.45 ± 0.05 | 1.44 ± 0.08 | 1.29 ± 0.08 | 1.29 ± 0.08 |

The data indicate that the uptake capacity of the sorbent decreases with surface functionalization which is mainly due to reduced surface area; however, an advantageous increase in the rate of uptake for specific target compounds was observed for the functionalized mesoporous silica.

Example 10

Determination of Sampling Rate for VOC and SVOC

Sampling rates were determined for a wide range of compounds including n-octane, trichloroethylene, n-hexane, naphthalene, and TNT adsorbed on the surface of non-functionalized OSU-6 at exact PEL exposures for 15 min and 8 h inside a dosing chamber. The mass gain obtained after the sorbent exposure to analyte vapor is related to the sampling rate via the following equation, where M is the mass gain in ng, SR is the sampling rate in $cm^3$/min, C is the concentration of analyte vapor in $mg/m^3$, and t is the exposure time in min.

$$M = SR \times C \times t$$

The sampling rate SR can then be expressed as follows:

$$SR = \frac{M}{C \times t}$$

The values of M were obtained from the results of the recovery via the solvent extraction technique described above. The calculated sampling rates are listed in the table below.

| Class | Target compound | OSHA PEL limit (ppm) | Sampling rate (mL/min) | |
| --- | --- | --- | --- | --- |
|  |  |  | XploSafe (15 min) | XploSafe (8 h) |
| Polynuclear hydrocarbons | Naphthalene | 10 | — | 3.3 |
| Carbonyl compounds | Acetaldehyde | 100 | 32.1 | 3.2 |
|  | Acrolein | 0.1 |  |  |
|  | Vinyl acetate | 10 | 3.6 | 3.9 |

-continued

| Class | Target compound | OSHA PEL limit (ppm) | Sampling rate (mL/min) | |
|---|---|---|---|---|
| | | | XploSafe (15 min) | XploSafe (8 h) |
| Fuels | Benzene | 1 | 6.6 | 5.2 |
| | n-Hexane | 50 | 12.7 | 2.8 |
| | n-Octane | 300 | 6.8 | 2.7 |
| | 1,2,4-Trimethylbenzene | 25 | 4.1 | 2.9 |
| | o-Xylene | 100 | 2.0 | 1.7 |
| Chlorinated solvents | Methylene chloride | 25 | 108.9 | 15.4 |
| | Trichloroethylene | 100 | 1.7 | 0.88 |
| Organophosphates | Dichlorvos | 0.1 | 12.5 | 11.5 |
| Nitramines | RDX | 0.2 | | |
| Pyrethroids | Permethrin | 0.3 | | |
| Nitroaromatics | TNT | 0.2 | — | 0.25 |
| Tetrazoles | 1,2,3,4-tetrazole | — | | |
| | 5-aminotetrazole | — | | |
| Chlorocarbons organochlorines | PCB 209 | 0.025 | | |

Example 11

Evaluation of Dosimeters

The clip-on dosimeter badge prototypes were exposed to vanillin vapors. The vapors originated from four open containers of 3" in diameter that contained 2 g of pure vanillin powder placed inside an office room with dimensions of 15'×17'×7.5'. Two different experiments were conducted for 15 min and 8 h, corresponding to the standard short-term and long-term OSHA exposures. It must be noted that the maximum vanillin concentration in air corresponding to that of its saturated vapor is very low and is equal to 0.16 ppm.

The sorbent from the dosimeter badge exposed to vanillin was analyzed by a mass spectrometer (MS), and the obtained results are listed in the table below.

| Sample | Exposure time | Vanillin MS intensity (m/z = 151) | Estimated vanillin content |
|---|---|---|---|
| Vanillin powder | — | 800,000 | 0.1 mg |
| Dosimeter sorbent | 15 min | <500 | Less than 0.06 microg |
| Dosimeter sorbent | 8 hours | 4,000 | Less than 0.5 microg |

The dosimeter exposed to the air containing vanillin vapor for 8 hours exhibited two characteristic mass spectrometry peaks at m/z=151 and 152 with the peak ratio identical to that of pure vanillin vapor. While the dosimeter exposed for 15 minutes recorded significantly lower amounts of vanillin vapor (see Table 10), it is consistent with the very low pressure of vanillin vapor at room temperature ($1.6 \times 10^{-2}$ Pa). Due to the very high sensitivity of the MS analyzer to vanillin vapor, the intensity of 800,000 corresponds to the vanillin powder amount as low as 0.1 mg. Thus, the upper limit of the adsorbed vanillin amount can be estimated from the intensity ratios listed in Table 10. For sorbent sample exposed to vanillin vapor for 8 hours, the adsorbed vanillin content would be below 0.5 micrograms, which also corresponds to the estimated sampling rate of around 1 mL/min.

Example 12

Evaluation of Detonability of Explosive-Containing Sorbent

The following methods were used to determine whether an explosive-containing sorbent is detonable.

Impact Test.

An explosive impact tester designed and built by XploSafe, LLC (Stillwater, Okla.) was calibrated with pure HMTD and PETN to quantify the effect of impact. A small amount of explosive (not exceeding several milligrams) was placed inside the holder of the impact tester, and impacts corresponding to variable loads (from several hundred grams to 2 kg) and heights up to 100 cm were applied to it. The procedure was repeated minimum 10 times for each condition. The detonation threshold corresponded to the impact, at which detonation occurred in more than 50% cases (6 or more out of 10). After establishing threshold values for HMTD and PETN, the explosive-impregnated sorbent powder was tested at impacts at least two times greater than that required to detonate PETN.

Flame Test.

A small amount (up to several milligrams) of explosive-loaded OSU-6 was placed on a ceramic sheet and then exposed to open flame. The entire process was audio- and video-recorded using a digital camera. The material passed the test if no visible signs of detonation were observed.

Friction Test.

Friction sensitivity was measured using the German Bundesanstalt für Materialprufing (BAM) method (see http://www.dtic.mil/dtic/tr/fulltext/u2/a119982.pdf), the entire disclosure of which is hereby incorporated by reference. HMTD and PETN explosives were used to calibrate the tester by placing their small amounts (not exceeding several milligrams) onto a ceramic plate under the tester tip followed by the application of various loads (up to 10 kg). After that, the ceramic plate was slid by the attached source of compressed air. The procedure was repeated minimum 20 times for each condition. The detonation threshold corresponded to the impact, at which detonation occurred in more than 10% cases (2 or more out of 20). After establishing threshold values for HMTD and PETN, the explosive-impregnated sorbent powder was tested at impacts greater than that required to detonate PETN. This test simulates the potential initiation of explosive that may be caught in mechanical parts, which could apply a pinch or sliding load on the explosive.

Heat Test.

The heat test is conducted with a differential scanning calorimeter using standard operating procedures.

Example 13

Neutralization of Explosive-Containing Sorbent

The explosive-containing sorbent can be neutralized as follows.

Different proprietary reagent powders developed for particular explosive types and manufactured by XploSafe, LLC (Stillwater, Okla.) are provided for their neutralization. In a typical neutralization process, an appropriate amount of the reagent powder is dissolved in water and mixed with explosive-containing sorbent. After a period of at least 24-48 hours, any traces of the explosive material have been degraded and the entire mixture of fluid, neutralizing agent and sorbent is discarded. The spent sorbent contains only environmentally benign materials and no organic solvents or heavy metals.

Said proprietary reagents include one or more of the types of compounds selected from the group consisting of at least one organic acid, at least one surfactant, at least one sulfur-containing inorganic salt, at least one antioxidant, at least one oxidizing agent, at least one reducing agent, and a combination of two or more types thereof.

The above is a detailed description of particular embodiments of the invention. It will be appreciated that, although specific embodiments of the invention have been described herein for purposes of illustration, various modifications may be made without departing from the spirit and scope of the invention. Accordingly, the invention is not limited except as by the appended claims. All embodiments disclosed and claimed herein can be made and executed without undue experimentation in light of the present disclosure.

All integers and fractions within the limits/ranges specified herein are contemplated.

The invention claimed is:

1. A flexible device for passive sampling of volatile organic compound or semi-volatile organic compound in air or gaseous environment, the device comprising
   a flexible facing layer;
   a flexible intermediate layer;
   a flexible backing layer comprising attachment means; and
   one or more sorbent-holding containers disposed between said facing layer and said intermediate layer, said containers retaining respective charges of sorbent; wherein
   said facing layer, said intermediate layer, and said one or more sorbent-holding containers are permeable to volatile organic compound (VOC) and/or semi-volatile organic compound (SVOC).

2. The device of claim 1, wherein a) said facing layer and said intermediate layer are independently selected upon each occurrence from a mesh, fabric, foam, material through which VOC or SVOC can pass, or any combination thereof; b) said device further comprises one or more non-permeable sorb ent-holding containers comprising VOC- and SVOC-impermeable material defining a sealed chamber retaining a charge of sorbent; c) said device further comprises VOC- and SVOC-impermeable packaging material enclosing said device; d) said one or more porous sorbent-holding containers is replaceable; e) said device is reusable; f) said device further comprises VOC- and SVOC-impermeable packaging material enclosing said one or more sorbent-holding containers; g) said backing layer is non-permeable to VOC or SVOC; h) said backing layer is permeable to VOC or SVOC; i) one or more of said one or more sorbent-holding containers (along with its respective charge of sorbent) is replaced with a compressed article or loose powder comprising said sorbent; or j) a combination of any two or more of the above.

3. The device of claim 2, wherein a) said one or more sorbent-holding containers is flexible; b) said one or more sorbent-holding containers is independently selected upon each occurrence from the group consisting of cartridge, tube, wafer, pouch, sphere, or rod; c) said one or more sorbent-holding containers comprises PTFE (polytetrafluoroethylene); d) said intermediate layer comprises PTFE; e) said mesh comprises PTFE, polypropylene, PTFE-coated wire, and/or other material adapted for making a breathable mesh; f) said attachment means comprises hook-and-loop attachment, adhesive, or magnet; or g) a combination of any two or more of the above.

4. The device of claim 2, wherein said respective charges of sorbent are independently selected upon each occurrence from one or more portions of mesoporous silica sorbent of the MCM-41 type (hexagonal), wherein the mesoporous silica possesses a combination of two or more of the following physical properties:

| Property | |
| --- | --- |
| Linear formula | $SiO_2$ polymer |
| Pore structure | Hexagonal tubes |
| Pore size (diameter) | about 2 to about 30 nm |
| Pore volume | about 0.5 to about 2.0 $cm^3/g$ |
| Surface area | greater than about 600 $m^2/g$ |
| Channel wall thickness | about 1 to about 5 nm |

5. The device of claim 4, wherein the mesoporous silica comprises: a) at least one non-functionalized mesoporous silica; b) at least one functionalized mesoporous silica; c) said sorbent excludes a porous polymer; d) a combination of one or more non-functionalized mesoporous silica and one or more functionalized mesoporous silica; e) the sorbent in said one or more sorbent-holding containers is the same as the sorbent in said one or more non-permeable sorbent-holding containers; or f) a combination of any two or more of the above.

6. The device of claim 5, wherein the weight ratio of non-functionalized mesoporous silica to functionalized mesoporous silica range from about 1:100 to about 100:1.

7. The device of claim 4, wherein the sorbent has been functionalized with one or more adsorption modifier functional groups that improve in at least one aspect the adsorption of particular VOC or SVOC.

8. The device of claim 7, wherein: a) the one or more adsorption modifier functional groups are covalently bound to the porous medium; b) the one or more adsorption modifier functional groups are non-covalently bound to the porous medium; c) the mass content of functional groups in the porous medium as determined by thermogravimetric analysis is in the range of 20-25%; or d) a combination of any two or more thereof.

9. The device of claim 5, wherein the sorbent is silane-functionalized mesoporous silica.

10. The device according to claim 9, wherein the silane functionalized mesoporous silica has been functionalized by treating unfunctionalized mesoporous silica with a trialkoxyalkylsilane ($R^1Si(OR^2)_3$), wherein:
   $R^1$ is selected from the group consisting of aromatic group, alkyl group, oxygen-containing alkyl groups, sulfur-containing alkyl groups, nitrogen-containing alkyl groups, phenyl, biphenyl, (C1-C8)-alkyl, methyl, ethyl, propyl, butyl, pentyl, hexyl, heptyl, octyl, nonyl, decanyl, undecanyl, methoxytriethyleneoxypropyl, alkoxyalkyleneoxyalkyl, haloalkyl, halo-(C1-C8)-alkyl, aminoalkyl, alkoxyalkyl, polyaromatic, toluyl, fluoroalkyls, fluroaromatics, and their combinations; and
   $R^2$ is selected from the group consisting of alkyl, C1-C12-alkyl, with methyl, ethyl, and propyl being preferred, thereby forming a silane-functionalized mesoporous silica comprising plural silane groups $R^1Si$-covalently bound to oxygen molecules of the mesoporous silica.

11. The device of claim 9, wherein the silane functionalized mesoporous silica comprises functional groups with a chemical formula defined as —Si($R^1$)($OR^2$)$_n$—O$_m$—, wherein:
- $R^1$ is selected from the group consisting of aromatic group, alkyl group, oxygen-containing alkyl group, phenyl, biphenyl, C1-C8-alkyl, methyl, ethyl, propyl, butyl, pentyl, hexyl, heptyl, octyl, nonyl, decanyl, undecanyl, methoxytriethyleneoxypropyl, alkoxyalkyleneoxyalkyl, haloalkyl, alkoxyalkyl, polyaromatic, and toluyl;
- $R^2$ is selected from the group consisting of alkyl, C1-C12-alkyl, methyl, ethyl, propyl, butyl, pentyl, hexyl, heptyl, octyl, nonyl, decanyl, and undecanyl,
- thereby forming a silane-functionalized mesoporous silica comprising plural silane groups $R^1$Si-covalently bound to oxygen molecules of the mesoporous silica; and
- wherein n is 0, 1 or 2, and m is 2, 1, or 0, respectively.

12. The device of claim 1, wherein a) the sorbent releases at least 75 wt % of adsorbed VOC or SVOC when the sorbent is exposed to heat or organic solvent; and/or b) the sorbent releases less than 25% of VOC or SVOC during storage at ambient temperature for a period of at least 1 week.

13. A flexible device for passive sampling of volatile organic compound or semi-volatile organic compound in air or gaseous environment, the device comprising
- a flexible facing layer;
- a flexible intermediate layer;
- a flexible backing layer comprising attachment means; and
- one or more sorbent-holding containers disposed between said facing layer and said intermediate layer, said containers retaining respective charges of sorbent;
- one or more non-permeable sorbent-holding containers comprising VOC- and SVOC-impermeable material defining a sealed chamber retaining a charge of sorbent; wherein
- said facing layer, said intermediate layer, and said one or more sorbent-holding containers are permeable to volatile organic compound (VOC) and/or semi-volatile organic compound (SVOC).

14. The device of claim 13, wherein a) said facing layer and said intermediate layer are independently selected upon each occurrence from a mesh, fabric, foam, material through which VOC or SVOC can pass, or any combination thereof; b) said device further comprises VOC- and SVOC-impermeable packaging material enclosing said device; c) said one or more porous sorbent-holding containers is replaceable; d) said device is reusable; e) said device further comprises VOC- and SVOC-impermeable packaging material enclosing said one or more sorbent-holding containers; f) said backing layer is non-permeable to VOC or SVOC; g) said backing layer is permeable to VOC or SVOC; h) one or more of said one or more sorbent-holding containers (along with its respective charge of sorbent) is replaced with a compressed article or loose powder comprising said sorbent; or i) a combination of any two or more of the above.

15. The device of claim 14, wherein a) said one or more sorbent-holding containers is flexible; b) said one or more sorbent-holding containers is independently selected upon each occurrence from the group consisting of cartridge, tube, wafer, pouch, sphere, or rod; c) said one or more sorbent-holding containers comprises PTFE (polytetrafluoroethylene); d) said intermediate layer comprises PTFE; e) said mesh comprises PTFE, polypropylene, PTFE-coated wire, and/or other material adapted for making a breathable mesh; f) said attachment means comprises hook-and-loop attachment, adhesive, or magnet; or g) a combination of any two or more of the above.

16. The device of claim 14, wherein said respective charges of sorbent are independently selected upon each occurrence from one or more portions of mesoporous silica sorbent of the MCM-41 type (hexagonal), wherein the mesoporous silica possesses a combination of two or more of the following physical properties:

| Property | |
| --- | --- |
| Linear formula | $SiO_2$ polymer |
| Pore structure | Hexagonal tubes |
| Pore size (diameter) | about 2 to about 30 nm |
| Pore volume | about 0.5 to about 2.0 cm$^3$/g |
| Surface area | greater than about 600 m$^2$/g |
| Channel wall thickness | about 1 to about 5 nm |

17. The device of claim 16, wherein the mesoporous silica comprises: a) at least one non-functionalized mesoporous silica; b) at least one functionalized mesoporous silica; c) said sorbent excludes a porous polymer; d) a combination of one or more non-functionalized mesoporous silica and one or more functionalized mesoporous silica; e) the sorbent in said one or more sorbent-holding containers is the same as the sorbent in said one or more non-permeable sorbent-holding containers; or f) a combination of any two or more of the above.

* * * * *